(12) United States Patent
Vandergon et al.

(10) Patent No.: US 11,707,860 B2
(45) Date of Patent: Jul. 25, 2023

(54) LIQUID PRESSURIZATION PUMP AND SYSTEMS WITH DATA STORAGE

(71) Applicant: Hypertherm, Inc., Hanover, NH (US)

(72) Inventors: Cedar J. Vandergon, New Brighton, MN (US); Jon W. Lindsay, Grantham, NH (US); Steve E. Voerding, New Brighton, MN (US); Brett A. Hansen, Mapleton, UT (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 17/407,072

(22) Filed: Aug. 19, 2021

(65) Prior Publication Data

US 2022/0055245 A1    Feb. 24, 2022

Related U.S. Application Data

(63) Continuation of application No. 16/521,319, filed on Jul. 24, 2019, now Pat. No. 11,110,626, which is a
(Continued)

(51) Int. Cl.
*B26F 3/00* (2006.01)
*G01K 1/143* (2021.01)
(Continued)

(52) U.S. Cl.
CPC .............. *B26F 3/004* (2013.01); *G01K 1/024* (2013.01); *G01K 1/14* (2013.01); *G01K 1/143* (2013.01); *B24C 5/04* (2013.01)

(58) Field of Classification Search
CPC .......... B26F 3/004; G01K 1/024; G01K 1/14; G01K 1/143; B24C 5/04
See application file for complete search history.

(56) References Cited

U.S. PATENT DOCUMENTS

| 2,985,050 A | 5/1961 | Schwacha |
| 3,010,012 A | 11/1961 | Tuthill |

(Continued)

FOREIGN PATENT DOCUMENTS

| CA | 2439213 C | 10/2006 |
| EP | 508482 A2 | 10/1992 |

(Continued)

OTHER PUBLICATIONS

Examination Report for corresponding Australian Patent Application No. 2013243978, dated Nov. 17, 2015, 4 pages.
(Continued)

*Primary Examiner* — Omar Flores Sanchez
(74) *Attorney, Agent, or Firm* — Cesari & McKenna, LLP

(57) ABSTRACT

The invention features methods and apparatuses for altering a cutting operation during operation of the pressurized liquid jet cutting system. A pressurized liquid jet cutting system includes a pressurized fluid jet cutting head having a plurality of components. The cutting head further includes a sensor configured to sense an operating condition. The sensor transmits a value of the operating condition to a computing device, which alters a subsequent cutting operation. Further, the fluid jet cutting head is configured to work with a data storage mechanism and a reader, such that the data storage mechanism in contact with a body of the fluid jet cutting head is configured to communicate information to a reader of the pressurized liquid jet cutting system. The information is usable to determine a condition of replacement (e.g., a remaining usable life) of the replaceable component, change an operating pressure, change a cutting speed, or alter another operating parameter of the pressurized liquid jet cutting system.

26 Claims, 11 Drawing Sheets

Related U.S. Application Data continuation of application No. 15/974,557, filed on May 8, 2018, now Pat. No. 10,786,924, which is a continuation-in-part of application No. 14/641,897, filed on Mar. 9, 2015, now Pat. No. 9,993,934.

(60) Provisional application No. 61/949,922, filed on Mar. 7, 2014.

(51) Int. Cl.
  *G01K 1/14* (2021.01)
  *G01K 1/024* (2021.01)
  *B24C 5/04* (2006.01)

(56) References Cited

U.S. PATENT DOCUMENTS

| | | |
|---|---|---|
| 3,018,360 A | 1/1962 | Engel |
| 3,518,401 A | 6/1970 | Mathews |
| 3,602,683 A | 8/1971 | Hishida et al. |
| 3,996,070 A | 12/1976 | Fletcher et al. |
| 4,125,754 A | 11/1978 | Wasserman et al. |
| 4,497,029 A | 1/1985 | Kiyokawa |
| 4,519,835 A | 5/1985 | Gauvin et al. |
| 4,588,880 A | 5/1986 | Hesser |
| 4,733,052 A | 3/1988 | Nilsson et al. |
| 4,742,470 A | 5/1988 | Juengel |
| 4,929,811 A | 5/1990 | Blankenship |
| 5,018,670 A | 5/1991 | Chalmers |
| 5,050,106 A | 9/1991 | Yamamato et al. |
| 5,086,655 A | 2/1992 | Fredericks et al. |
| 5,099,226 A | 3/1992 | Andrews |
| 5,248,867 A | 9/1993 | Ohba et al. |
| 5,309,683 A | 5/1994 | Hockett |
| 5,357,076 A | 10/1994 | Blankenship |
| 5,381,487 A | 1/1995 | Shamos |
| 5,388,965 A | 2/1995 | Fehn |
| 5,390,964 A | 2/1995 | Gray, Jr. |
| 5,400,389 A | 3/1995 | Niiyama et al. |
| 5,440,477 A | 8/1995 | Rohrberg et al. |
| 5,500,512 A | 3/1996 | Goldblatt |
| 5,556,562 A | 9/1996 | Sorenson |
| 5,643,058 A | 7/1997 | Erichsen et al. |
| 5,653,264 A | 8/1997 | Atkinson |
| 5,717,187 A | 2/1998 | Rogozinski et al. |
| 5,860,849 A | 1/1999 | Miller |
| 5,994,663 A | 11/1999 | Lu |
| 6,047,579 A | 4/2000 | Schmitz |
| 6,130,407 A | 10/2000 | Villafuerte |
| 6,133,542 A | 10/2000 | Dvorak et al. |
| 6,201,207 B1 | 3/2001 | Maruyama et al. |
| 6,248,975 B1 | 6/2001 | Lanouette et al. |
| 6,259,059 B1 | 7/2001 | Hsu |
| 6,267,291 B1 | 7/2001 | Blankenship et al. |
| 6,326,583 B1 | 12/2001 | Hardwick et al. |
| 6,409,476 B2 | 6/2002 | Mills |
| 6,479,793 B1 | 11/2002 | Wittmann et al. |
| 6,510,984 B2 | 1/2003 | Blankenship et al. |
| 6,539,813 B1 | 4/2003 | Horiuchi et al. |
| 6,563,085 B2 | 5/2003 | Lanouette et al. |
| 6,657,162 B1 | 12/2003 | Jung et al. |
| 6,659,098 B1 | 12/2003 | Sekiya |
| 6,693,252 B2 | 2/2004 | Zhang et al. |
| 6,707,304 B2 | 3/2004 | Buhler et al. |
| 6,717,096 B2 | 4/2004 | Hewett et al. |
| 6,729,468 B1 | 5/2004 | Dobmeier |
| 6,772,040 B1 | 8/2004 | Picard et al. |
| 6,781,085 B2 | 8/2004 | Ulrich et al. |
| 6,836,698 B2 | 12/2004 | Fujishima et al. |
| 6,852,949 B2 | 2/2005 | Lanouette et al. |
| 6,919,526 B2 | 7/2005 | Kinerson et al. |
| 6,933,462 B2 | 8/2005 | Iriyama et al. |
| 6,960,737 B2 | 11/2005 | Tatham |
| 6,980,704 B2 | 12/2005 | Kia et al. |
| 6,992,262 B2 | 1/2006 | Matus et al. |
| 6,995,545 B2 | 2/2006 | Tracy et al. |
| 7,030,337 B2 | 4/2006 | Baker et al. |
| 7,032,814 B2 | 4/2006 | Blankenship |
| 7,115,833 B2 | 10/2006 | Higgins et al. |
| 7,186,944 B2 | 3/2007 | Matus et al. |
| 7,307,533 B2 | 12/2007 | Ishii |
| 7,358,458 B2 | 4/2008 | Daniel |
| 7,375,302 B2 | 5/2008 | Twarog et al. |
| 7,411,154 B2 | 8/2008 | Fosbinder et al. |
| 7,645,960 B2 | 1/2010 | Stava |
| 7,651,269 B2 | 1/2010 | Comendant |
| 7,671,294 B2 | 3/2010 | Belashchenko et al. |
| 7,680,625 B2 | 3/2010 | Trowbridge et al. |
| 7,728,401 B2 | 6/2010 | Takatori |
| 7,755,484 B2 | 7/2010 | Cullen et al. |
| 7,843,334 B2 | 11/2010 | Kumagai et al. |
| 8,035,487 B2 | 10/2011 | Malackowski |
| 8,085,150 B2 | 12/2011 | Oberle |
| 8,141,240 B2 | 3/2012 | Hiew et al. |
| 8,203,095 B2 | 6/2012 | Storm et al. |
| 8,204,618 B2 | 6/2012 | Young, Jr. et al. |
| 8,242,907 B2 | 8/2012 | Butler et al. |
| 8,263,896 B2 | 9/2012 | Schneider |
| 8,272,794 B2 | 9/2012 | Silchenstedt et al. |
| 8,278,588 B2 | 10/2012 | Salsich et al. |
| 8,316,742 B2 | 11/2012 | Craig |
| 8,373,084 B2 | 2/2013 | Salsich |
| 8,376,671 B2 | 2/2013 | Kaneko |
| 8,395,076 B2 | 3/2013 | Matus |
| 8,431,862 B2 | 4/2013 | Kachline |
| 8,620,738 B2 | 12/2013 | Fordyce, III et al. |
| 8,658,941 B2 | 2/2014 | Albrecht |
| 8,686,318 B2 | 4/2014 | Albrecht |
| 8,748,776 B2 | 6/2014 | Albrecht |
| 8,759,715 B2 | 6/2014 | Narayanan et al. |
| 8,766,132 B2 | 7/2014 | Blankenship et al. |
| 8,859,828 B2 | 10/2014 | Liu et al. |
| 8,859,928 B2 | 10/2014 | Sommerfeld |
| 9,031,683 B2 | 5/2015 | Elfstrom et al. |
| 9,129,330 B2 | 9/2015 | Albrecht et al. |
| 9,229,436 B2 | 1/2016 | Stumpfl et al. |
| 9,233,480 B2 | 1/2016 | Nagai et al. |
| 9,316,546 B2 | 4/2016 | Tsubaki et al. |
| 9,724,787 B2 | 8/2017 | Becker et al. |
| 10,278,274 B2 | 4/2019 | Sanders et al. |
| 10,314,155 B2 | 6/2019 | Patel et al. |
| 10,321,551 B2 | 6/2019 | Zhang et al. |
| 2002/0117484 A1 | 8/2002 | Jones et al. |
| 2002/0194064 A1 | 12/2002 | Parry et al. |
| 2003/0025598 A1 | 2/2003 | Wolf et al. |
| 2003/0029934 A1 | 2/2003 | Hashish et al. |
| 2003/0094487 A1 | 5/2003 | Blankenship et al. |
| 2003/0148709 A1 | 8/2003 | Anand et al. |
| 2004/0031776 A1 | 2/2004 | Gevelber et al. |
| 2004/0106101 A1 | 6/2004 | Evans |
| 2004/0193307 A1 | 9/2004 | Fujishima et al. |
| 2005/0035093 A1 | 2/2005 | Yamaguchi |
| 2005/0045599 A1 | 3/2005 | Matus |
| 2005/0109738 A1 | 5/2005 | Hewett et al. |
| 2005/0145688 A1 | 7/2005 | Milenkovic et al. |
| 2005/0173390 A1 | 8/2005 | Lanouette et al. |
| 2005/0266777 A1 | 12/2005 | Yoon |
| 2006/0006154 A1 | 1/2006 | Koike |
| 2006/0020415 A1 | 1/2006 | Hardwicke et al. |
| 2006/0070986 A1 | 4/2006 | Ihde et al. |
| 2006/0163216 A1 | 7/2006 | Brandt et al. |
| 2006/0163228 A1 | 7/2006 | Daniel |
| 2006/0163230 A1 | 7/2006 | Kaufman |
| 2006/0201923 A1 | 9/2006 | Hutchison |
| 2006/0289406 A1 | 12/2006 | Helenius et al. |
| 2007/0012099 A1 | 1/2007 | Becourt |
| 2007/0080149 A1 | 4/2007 | Albrecht |
| 2007/0080151 A1 | 4/2007 | Albrecht |
| 2007/0080152 A1 | 4/2007 | Albrecht |
| 2007/0080153 A1 | 4/2007 | Albrecht et al. |
| 2007/0193988 A1 | 8/2007 | Joannis et al. |
| 2007/0210034 A1 | 9/2007 | Mather et al. |
| 2007/0294608 A1 | 12/2007 | Winterhalter et al. |
| 2008/0001752 A1 | 1/2008 | Bruns |

(56) References Cited

U.S. PATENT DOCUMENTS

| | | |
|---|---|---|
| 2008/0011821 A1 | 1/2008 | Ellender et al. |
| 2008/0023451 A1 | 1/2008 | Salsich et al. |
| 2008/0061049 A1 | 3/2008 | Albrecht |
| 2008/0066596 A1 | 3/2008 | Yamaguchi |
| 2008/0083711 A1 | 4/2008 | Twarog et al. |
| 2008/0093476 A1 | 4/2008 | Johnson et al. |
| 2008/0118253 A1 | 5/2008 | Abe |
| 2008/0149608 A1 | 6/2008 | Albrecht |
| 2008/0149686 A1 | 6/2008 | Daniel et al. |
| 2008/0156783 A1 | 7/2008 | Vanden Heuvel |
| 2008/0217305 A1 | 9/2008 | Sanders |
| 2008/0223952 A1 | 9/2008 | Wernli et al. |
| 2008/0257874 A1 | 10/2008 | Kaufman et al. |
| 2008/0308641 A1 | 12/2008 | Finn |
| 2009/0008370 A1 | 1/2009 | Salsich et al. |
| 2009/0057286 A1 | 3/2009 | Ihara et al. |
| 2009/0065489 A1 | 3/2009 | Duffy |
| 2009/0078196 A1 | 3/2009 | Midorikawa |
| 2009/0107960 A1 | 4/2009 | Hampton |
| 2009/0152255 A1 | 6/2009 | Ma |
| 2009/0159572 A1 | 6/2009 | Salsich |
| 2009/0159575 A1 | 6/2009 | Salsich |
| 2009/0163130 A1 | 6/2009 | Zambergs |
| 2009/0184098 A1 | 7/2009 | Daniel et al. |
| 2009/0212027 A1 | 8/2009 | Borowy |
| 2009/0219136 A1 | 9/2009 | Brunet et al. |
| 2009/0222804 A1 | 9/2009 | Kaufman |
| 2009/0230097 A1 | 9/2009 | Liebold et al. |
| 2009/0240368 A1 | 9/2009 | Young, Jr. et al. |
| 2009/0288532 A1 | 11/2009 | Hashish |
| 2009/0312862 A1 | 12/2009 | Fagan |
| 2010/0046210 A1 | 2/2010 | Mathai et al. |
| 2010/0078408 A1 | 4/2010 | Liebold et al. |
| 2010/0084381 A1 | 4/2010 | Indraczek et al. |
| 2010/0155377 A1 | 6/2010 | Lindsay et al. |
| 2010/0324868 A1 | 12/2010 | Russell et al. |
| 2011/0000893 A1 | 1/2011 | Blankenship et al. |
| 2011/0029385 A1 | 2/2011 | Engel et al. |
| 2011/0114616 A1 | 5/2011 | Albrecht |
| 2011/0163857 A1 | 7/2011 | August et al. |
| 2011/0220630 A1 | 9/2011 | Speilman et al. |
| 2011/0294401 A1 | 12/2011 | Habermann et al. |
| 2012/0021676 A1 | 1/2012 | Schubert et al. |
| 2012/0138583 A1 | 6/2012 | Winn et al. |
| 2012/0139692 A1 | 6/2012 | Neubauer et al. |
| 2012/0234803 A1 | 9/2012 | Liu et al. |
| 2012/0241428 A1 | 9/2012 | Kowaleski |
| 2013/0001221 A1 | 1/2013 | Lambert |
| 2013/0068732 A1 | 3/2013 | Watson et al. |
| 2013/0087537 A1 | 4/2013 | Barnett et al. |
| 2013/0163637 A1 | 6/2013 | Parsons et al. |
| 2013/0167697 A1 | 7/2013 | Reukers |
| 2013/0179241 A1 | 7/2013 | Liu |
| 2013/0210319 A1 | 8/2013 | Gramling et al. |
| 2013/0263420 A1 | 10/2013 | Shipulski |
| 2013/0264317 A1 | 10/2013 | Hoffa et al. |
| 2013/0264320 A1 | 10/2013 | Shipulski et al. |
| 2014/0029178 A1 | 1/2014 | Trudeau, Jr. et al. |
| 2014/0061170 A1 | 3/2014 | Lindsay et al. |
| 2014/0069895 A1 | 3/2014 | Brine et al. |
| 2014/0113527 A1 | 4/2014 | Lindsay et al. |
| 2014/0116217 A1 | 5/2014 | Hashish |
| 2014/0165807 A1 | 6/2014 | David et al. |
| 2014/0170935 A1 | 6/2014 | Maurer |
| 2014/0235140 A1 | 8/2014 | Maurer |
| 2014/0335761 A1 | 11/2014 | Chou et al. |
| 2015/0108223 A1 | 4/2015 | Weitzhandler |
| 2015/0127137 A1 | 5/2015 | Brandt et al. |
| 2015/0196989 A1 | 7/2015 | Hashish et al. |
| 2015/0251267 A1 | 9/2015 | Winn et al. |
| 2015/0251331 A1 | 9/2015 | Vandergon et al. |
| 2015/0332071 A1 | 11/2015 | Hoffa et al. |
| 2015/0371129 A1 | 12/2015 | Hoffa et al. |
| 2016/0221108 A1 | 8/2016 | Hoffa et al. |
| 2016/0230763 A1 | 8/2016 | Ignatiev et al. |
| 2017/0042011 A1 | 2/2017 | Sanders et al. |
| 2017/0042012 A1 | 2/2017 | Sanders et al. |
| 2017/0046544 A1 | 2/2017 | Ikemoto |
| 2017/0091634 A1 | 3/2017 | Ritter |
| 2018/0099378 A1 | 4/2018 | Hashish et al. |
| 2018/0257253 A1 | 9/2018 | Vandergon et al. |
| 2019/0344466 A1 | 11/2019 | Vandergon et al. |

FOREIGN PATENT DOCUMENTS

| | | | |
|---|---|---|---|
| EP | 1117279 | A1 | 7/2001 |
| EP | 1288016 | A1 | 3/2003 |
| JP | 6163368 | A | 4/1986 |
| JP | H05154732 | A | 6/1993 |
| JP | H11285831 | A | 10/1999 |
| JP | 2003025176 | A | 1/2003 |
| JP | 2003048134 | A | 2/2003 |
| JP | 2009252085 | A | 10/2009 |
| JP | 2012048287 | A | 3/2012 |
| JP | 2012079221 | A | 4/2012 |
| RU | 2354460 | C2 | 10/2008 |
| WO | WO 2008150136 | A1 | 11/2008 |
| WO | WO 2008144785 | A1 | 12/2008 |
| WO | WO 2010142858 | A1 | 12/2010 |
| WO | WO 2013000700 | A1 | 1/2013 |
| WO | WO 2013151886 | A2 | 10/2013 |

OTHER PUBLICATIONS

International Search Report for International Application No. PCT/US2013/021364 dated Jan. 14, 2013 4 pages.

International Search Report for International Application No. PCT/US2013/034572 dated Mar. 29, 2013 4 pages.

International Search Report for International Application No. PCT/US2014/055638 dated Dec. 17, 2014, 5 pages.

Torchmate Arc Voltage Torch Height Control—Operation Manual, Applied Robotics, Inc., Oct. 2005, pp. 1-19.

Invitation to Pay Additional Fees with partial International Search Report for PCT/US2014/051106 dated Oct. 30, 2014, 6 pages.

International Search Report for International Application No. PCT/US2013/034572 dated Feb. 13, 2014 4 pages.

International Search Report for International Application No. PCT/US2013/021364 dated Feb. 5, 2014 4 pages.

TRUMPF Press Release, New RFID lens provides LensLine sensor system with improved condition checking capabilities, online press release available at http://www.trumpf.com/nc/en/press/press-releases/press-release/rec-uid/266044.html, Aug. 12, 2013. (4 pages).

LIQUID PRESSURIZATION PUMP AND SYSTEMS WITH DATA STORAGE

CROSS REFERENCE TO RELATED APPLICATIONS

This application is a continuation of U.S. application Ser. No. 16/521,319, filed on Jul. 24, 2019 and entitled "Liquid Pressurization Pump and Systems with Data Storage," which is a continuation of U.S. application Ser. No. 15/974,557, filed on May 8, 2018 and issued as U.S. Pat. No. 10,786,924 on Sep. 29, 2020, and entitled "Waterjet Cutting Head Temperature Sensor," which is a continuation-in-part of U.S. application Ser. No. 14/641,897, filed on Mar. 9, 2015 and issued as U.S. Pat. No. 9,993,934 on Jun. 12, 2018, and entitled "Liquid Pressurization Pump and Systems with Data Storage," which claims priority to U.S. Provisional Patent Application No. 61/949,922, filed on Mar. 7, 2014 and entitled "Waterjet Intensifier Pump and Systems with RFID." The disclosures of these applications are incorporated herein by reference in their entirety.

FIELD OF THE INVENTION

The invention relates generally to the field of pressurized liquid jet cutting systems and processes. More specifically, the invention relates to methods and apparatuses for altering a cutting operation during operation of the pressurized liquid jet cutting system, including determining replacement schemes for components of the system, changing an operating pressure, or changing a cutting speed.

Pressurized liquid jet cutting systems use a cutting head to cut a wide variety of materials using a very high-pressure jet of liquid, typically water, or alternatively, a mixture of water and an abrasive substance. Pressurized liquid jet cutting is used during fabrication of machine parts and it is often the preferred method when the materials being cut are sensitive to the high temperatures generated by other cutting methods.

Cutting heads of pressurized liquid jet cutting systems can sometimes leak, due to one or more varied reasons. The presence of the leak may degrade the cutting head or other component parts thereof. There is thus a need in the applicable industry to design and improve cutting head technology for improved performance of the pressurized liquid jet cutting system.

BACKGROUND

Liquid pressurization systems produce high pressure (e.g., up to 90,000 pounds per square inch or greater) streams of liquid for various applications. For example, high pressure liquid may be delivered to a liquid jet cutting head, a cleaning tool, a pressure vessel or an isostatic press. In the case of liquid jet cutting systems, liquid is forced through a small orifice at high velocity to concentrate a large amount of energy on a small area. To cut hard materials, a liquid jet can be "abrasive" or include abrasive particles for increasing cutting ability. As used herein, the term "liquid jet" includes any substantially pure water jet, liquid jet, and/or slurry jet. However, one of ordinary skill in the art would easily appreciate that the invention applies equally to other systems that use liquid pumps or similar technology.

Many key components of pumps for liquid pressurization systems require frequent maintenance or replacement. For example, common failure modes in liquid pressurization pumps include: leaking of seal assemblies and plunger hydraulic seals; fatigue failures of high pressure cylinders, check valves, proximity switches, and attenuators; and wearing of bleed down valves due to repeated venting of high pressure water in the pump at shut down. Currently, each time a key component of a liquid pressurization pump fails, a pump operator must disable the pump to perform repairs, causing the system to suffer substantial down time.

Similarly, key components of cutting heads require maintenance and monitoring over time due to the use of abrasive in the liquid jet and to their operation in a high temperature environment. For example, common failure modes in cutting heads include: growth of the opening of nozzles over time, leaks or undesired openings in the cutting head, and rising temperature levels in the cutting head from increased friction therein.

Usage hours for key system components are currently tracked manually, but manual tracking suffers from significant drawbacks. First, manual tracking is time-consuming and cumbersome, particularly when many replaceable components must be monitored. Second, manual tracking does not effectively minimize system down time. What is needed is a liquid pressurization system that efficiently tracks usage of key system components, predicts failure modes in advance of system failure, alters cutting operations based on a sensed operating condition, and optimizes replacement schedules to minimize system down time.

SUMMARY OF THE INVENTION

The present invention streamlines the component replacement process by fitting replaceable components with data storage devices that contain information usable to determine a condition of replacement (e.g., a useful remaining life) of each replaceable component. Usage information can be written to a data storage device or stored remotely. For example, usage information can be written to radio frequency identification (RFID) tags included on key pump components, and RFID readers can be used to read the information and monitor component usage. Accumulated usage information can be compared to tabulated information indicating the expected lives for specific replaceable components along relevant usage metrics (e.g., hours of usage). A user alert can be generated when one or more key components approaches the end of its expected life. The usage information can be used to determine optimized batch replacement schedules for key components (e.g., by replacing multiple components that are near the end of life at the same batch replacement) to minimize system down time and improve preventive maintenance. The invention enables storing of information relating to a condition of replacement for a replaceable component and/or automatic tracking of information relating to a condition of replacement of the replaceable component. Thus, a component can be removed from the system and re-installed at a later date with accurate tracking. Storing expected life data directly on the replaceable component may be especially helpful over time as part designs improve expected life. When an improved part is installed, the tracking system can automatically adjust accordingly.

In one aspect, the invention features a replaceable component for use in a pump of a liquid pressurization system. The replaceable component includes a body portion. The replaceable component includes a data storage mechanism in physical contact with the body portion. The data storage mechanism is configured to communicate information to a reader of the liquid pressurization system. The information is usable to determine a condition of replacement of the replaceable component.

In some embodiments, the condition of replacement is a remaining usable life (e.g., measured in hours of operation or another suitable metric). In some embodiments, the replaceable component is one of a seal assembly, a check valve, a hydraulic seal cartridge, or a cylinder. In some embodiments, the replaceable component is for use in a liquid jet cutting system, an isostatic press or a pressure vessel. In some embodiments, the information denotes a type replaceable component.

In some embodiments, the data storage mechanism is a radio frequency identification mechanism. In some embodiments, the data storage mechanism is configured to record a number of pressure cycles to which the replaceable component has been exposed. In some embodiments, the information includes a period of use for the replaceable component. In some embodiments, the information includes a condition of use for the replaceable component. In some embodiments, the data storage mechanism is configured to automatically set at least one operating parameter of the liquid jet cutting system. In some embodiments, the body portion includes a connection mechanism for coupling the body portion to the liquid jet cutting system.

In some embodiments, the data storage mechanism is located in a low pressure region of the replaceable component. In some embodiments, the replaceable component includes a sensor. In some embodiments, the sensor is a temperature sensor. In some embodiments, the reader is configured to write to the data storage mechanism. In some embodiments, the data storage mechanism stores specific values of an operating condition over time. In some embodiments, the operating condition is one of temperature, pressure, leakage, moisture information and number of pressure or operational cycles. In some embodiments, the information comprises at least one of temperature, pressure, a number of operational cycles, a time of operation, a number of pump starts, or a measure of detected strain on the replaceable component.

In another aspect, the invention features a replaceable component for use in a pump of a liquid jet cutting system. The replaceable component includes a body portion configured to assist in producing a liquid jet. The replaceable component includes a data storage mechanism located in or on the body portion of the replaceable component. The data storage mechanism is configured to communicate information to a reader of the liquid jet cutting system. The information is usable to determine a replacement status for the replaceable component. The replaceable component is at least one of a cylinder, a check valve, a hydraulic seal housing, a plunger bearing, an output adaptor, a proximity switch, an attenuator, a bleed down valve, an indicator pin, a dynamic seal cartridge, a cutting head adapter, or an on/off valve body.

In another aspect, the invention features a liquid pressurization system. The liquid pressurization system includes a tool for delivering a pressurized liquid. The liquid pressurization system includes a pump fluidly connected to the tool. The pump includes a replaceable component having a data storage mechanism including information about the replaceable component. The pump includes a reader in communication with the data storage mechanism for reading the information. The pump includes a computing device in communication with the reader. The computing device determines a replacement schedule for the replaceable component based on the information.

In some embodiments, the reader is configured to write data to the data storage mechanism. In some embodiments, the computing device includes at least one of a computer numerical controller or a pump programmable logic controller. In some embodiments, the computing device is configured to adjust operating parameters of the liquid jet cutting system based on the information. In some embodiments, the computing device is configured to identify the replaceable component based on the information. In some embodiments, the replaceable component includes at least one of a cylinder, a check valve, a plunger bearing, an output adaptor, a proximity switch, a hydraulic seal housing, an attenuator, a bleed down valve, an indicator pin, a dynamic seal cartridge, a cutting head adapter, or an on/off valve body.

In some embodiments, the data storage mechanism is a radio frequency identification mechanism. In some embodiments, the tool is a cutting head. In some embodiments, the tool is a cleaning device. In some embodiments, the information denotes a type of replaceable component. In some embodiments, the information includes a time of use of the replaceable component. In some embodiments, the liquid pressurization system includes a connector disposed on the pump and connected to the reader. The connector can be configured to transmit the information to a computer numeric controller of the liquid jet cutting system. In some embodiments, the connector is further configured to convert the information from an analog format to a digital format.

In some embodiments, the liquid pressurization system includes an intensifier operably connected to the pump. In some embodiments, the liquid pressurization system includes an accumulator fluidly connected to the intensifier. In some embodiments, the liquid pressurization system includes a replacement schedule that is coordinated with replacement schedules of other replaceable components of the liquid jet cutting system. In some embodiments, the liquid pressurization system includes a second replaceable component. The second replaceable component includes a second data storage mechanism. The second data storage mechanism is in communication with the reader. In some embodiments, the liquid pressurization system includes two-way communication.

In another aspect, the invention features a method of scheduling a service event for a liquid pressurization system. The method includes providing a liquid pressurization system with a replaceable component including a data storage device. The method includes tracking usage information of the replaceable component using the data storage device. The method includes generating a notification based on the usage information of the liquid pressurization system when the replaceable component approaches the life expectancy.

In some embodiments, the method includes comparing usage information of the replaceable component of the liquid pressurization system to life expectancy information for the replaceable component. In some embodiments, the notification is generated after the replaceable component expends at least 90% of the life expectancy. In some embodiments, the method includes (i) providing a plurality of replaceable components on or in the liquid pressurization system, each replaceable component including a device for tracking usage information for each replaceable component; and/or (ii) planning an outage of the liquid pressurization system based on usage information for the plurality of replaceable components. In some embodiments, the method includes determining whether each of the plurality of replaceable components should be replaced based on the usage information for each respective component.

In another aspect, the invention features a pressurized liquid jet cutting head for use in a liquid jet cutting system. The liquid jet cutting head includes a body having one or more component parts coupled together; a junction defined between a first component part having a first engagement surface and a second component part having a second engagement surface, wherein the first and second engagement surfaces abut at the junction; and a temperature sensor in thermal communication with at least one of the first component part, the second component part, and the junction.

In another aspect, the invention features a method of detecting an error in a pressurized fluid jet cutting head. The method includes providing a cutting head having a first component part having a first interface and a second component part having a second interface, the first interface abutting the second interface. The method includes providing a temperature sensor in the cutting head for measuring a temperature associated with at least one of the first and second component parts. The method includes measuring a temperature by the temperature sensor. The method includes indicating an error associated with the one of the first and second component parts upon detecting a temperature change.

In some embodiments, the method includes receiving at a controller the measured temperature. The method includes comparing and correlating the measured temperature to one of a plurality of reference temperature profiles. The method includes identifying the error based upon the correlated profile.

In another aspect, the invention features a method of operating a pressurized fluid jet cutting head. The method includes measuring a temperature associated with at least one of the component parts and over a period of time to create a temperature gradient profile. The method includes controlling an operation of the cutting head based upon matching the temperature gradient profile to a reference profile.

BRIEF DESCRIPTION OF THE DRAWINGS

The foregoing discussion will be understood more readily from the following detailed description of the invention when taken in conjunction with the accompanying drawings.

DETAILED DESCRIPTION

Figure 1:
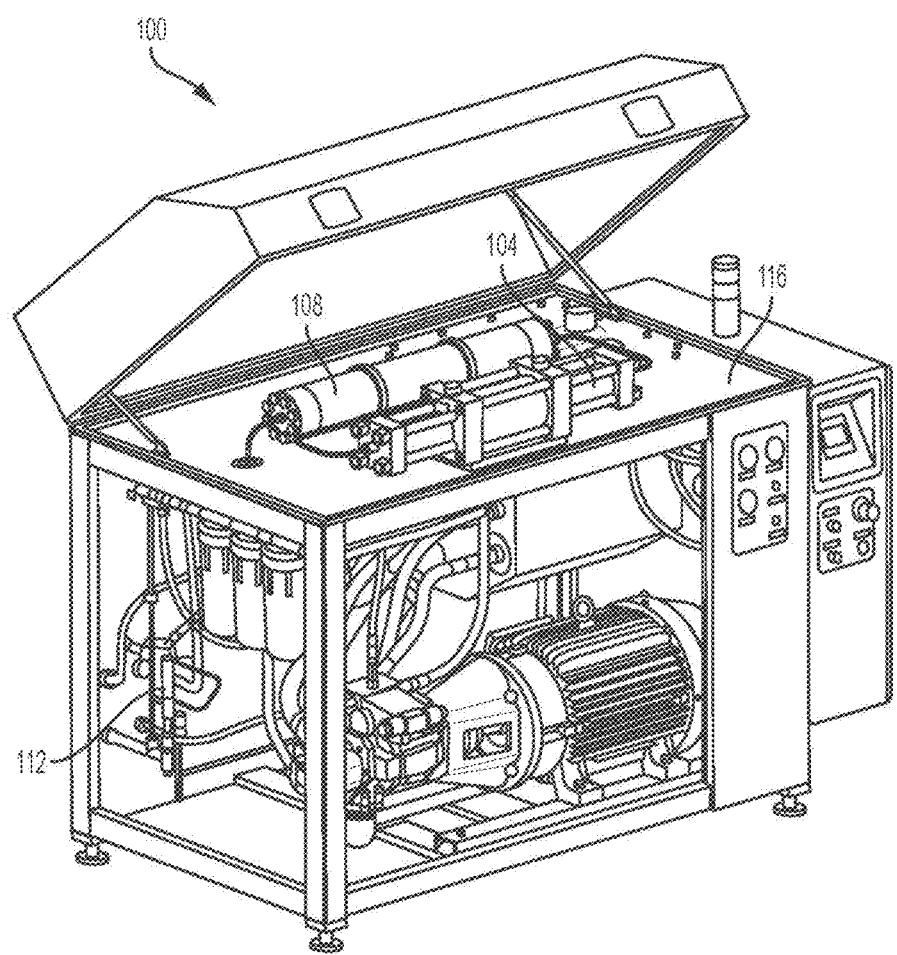
FIG. 1 is a schematic illustration of a pump for a liquid pressurization system, according to an illustrative embodiment of the invention.

FIG. 1 is a schematic illustration of a pump 100 for a liquid pressurization system, according to an illustrative embodiment of the invention. The pump 100 includes an intensifier pump 104, an attenuator 108, a bleed down valve 112 and a top deck 116. The intensifier pump 104 draws liquid (e.g., filtered water) through an intake valve and generates a high pressure liquid stream, e.g., a stream pressurized to about 90,000 psi. The intensifier pump 104 provides pressurized liquid to the attenuator 108, which is included in the top deck 116. The attenuator 108 dampens pressure fluctuations in the liquid to ensure a smooth and even flow of liquid. The pressurized liquid also flows through a bleed-down valve 112 in the pump 100. The bleed-down valve 112 prevents pressurized liquid from accumulating in the pump 100 when the pump 100 is turned off. The pressurized liquid is then provided via high-pressure tubing to a tool (not shown) that can be used for cutting, cleaning, or another desired application.

In some embodiments, the intensifier pump comprises a dual-head reciprocating pump typically driven by the output from a hydraulic pump. In this arrangement, hydraulic fluid is cyclically applied to opposite sides of a relatively large diameter piston where the piston has attached to it first and second oppositely directed plungers of relatively smaller diameter and that fit within oppositely directed cylinders. In operation, during a pressure stroke in one cylinder, liquid is drawn through a low-pressure poppet into the other cylinder during its suction stroke. Thus, as the hydraulic piston and plunger assembly reciprocates back and forth, it delivers high pressure liquid out of one side of the intensifier while low pressure liquid fills the opposite side.

Figure 2:
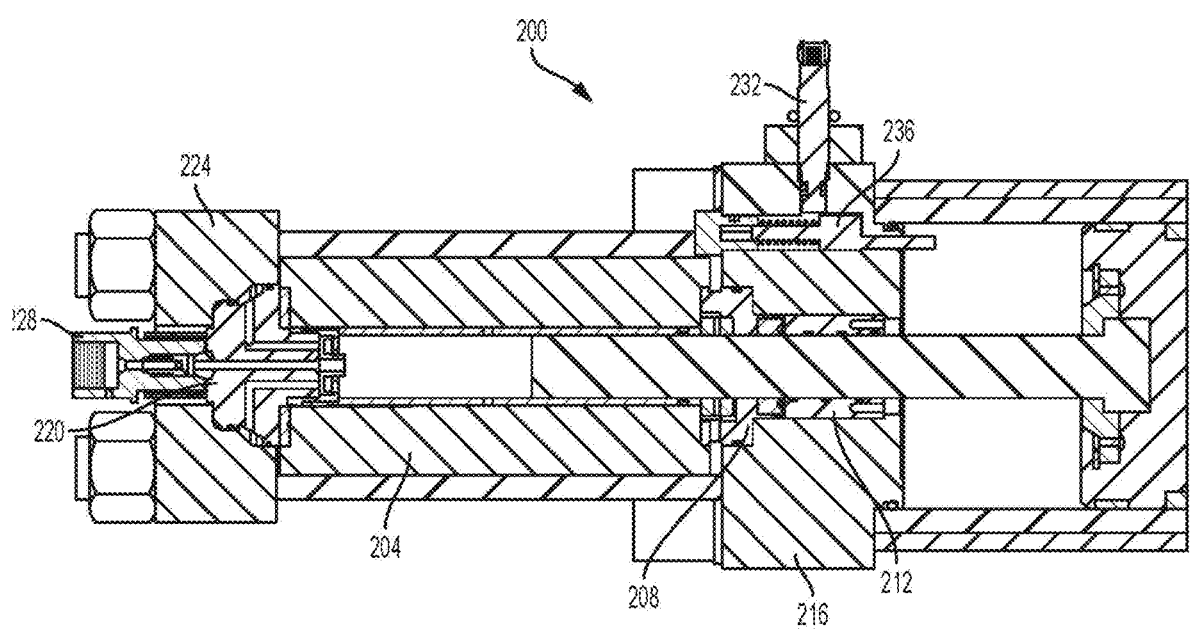
FIG. 2 is a schematic illustration of a portion of a high-pressure intensifier pump included in a pump of a liquid pressurization system, according to an illustrative embodiment of the invention.

FIG. 2 is a schematic illustration of a high-pressure intensifier pump 200 for a liquid pressurization system, according to an illustrative embodiment of the invention. The high-pressure intensifier pump includes standard replaceable pump components such as a cylinder 204, a hydraulic seal housing 208, a plunger bearing 212, a hydraulic end cap 216, a check valve body 220, a high pressure end cap 224, an output adapter 228, a proximity switch 232 and an indicator pin 236. One having ordinary skill in the art will recognize that each of these standard pump components will require replacement after its useful life has been expended. One having ordinary skill in the art will also recognize that the replaceable components shown are exemplary and that other pump components can also be replaceable as described herein. The description of FIGS. 3A-3B below demonstrates how replaceable components such as those shown in FIG. 2 operate in the invention described herein, while FIGS. 4-11 show illustrative implementations of the specific replaceable components described herein.

Figure 3A:
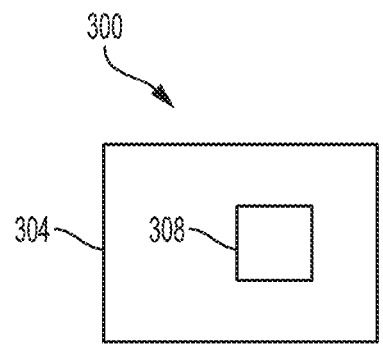
FIG. 3A is a schematic illustration of a replaceable component for a liquid pressurization system, according to an illustrative embodiment of the invention.
Figure 3B:
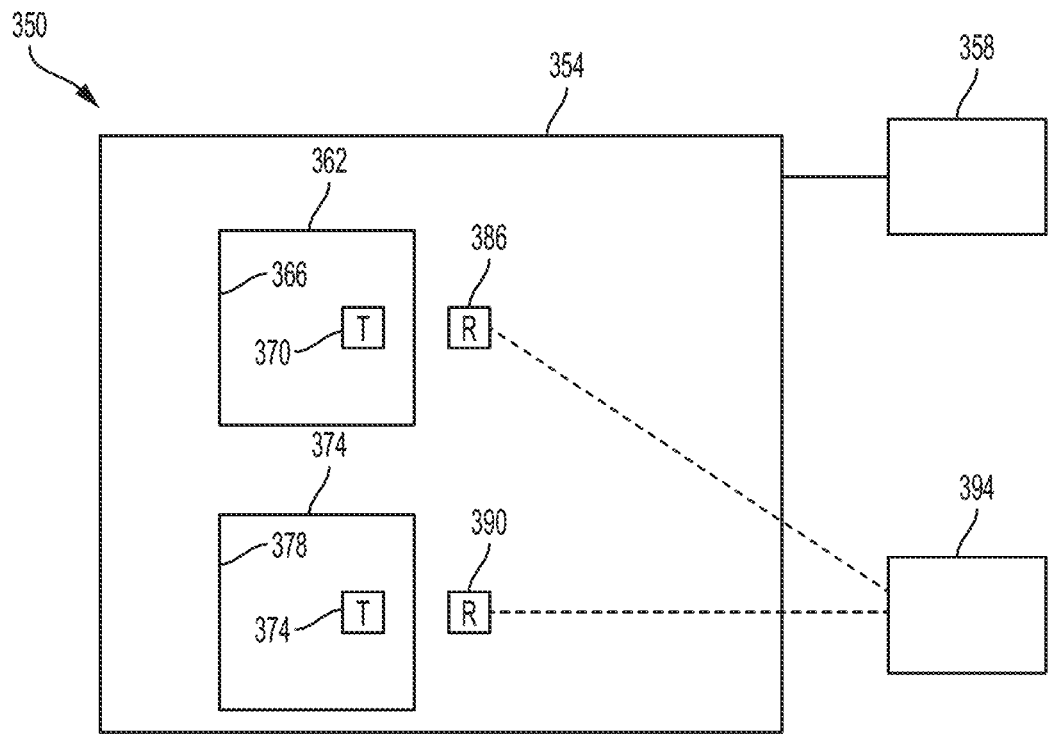
FIG. 3B is a schematic illustration of a liquid pressurization system capable of "intelligent" batch replacement of replaceable pump components, according to an illustrative embodiment of the invention.

FIG. 3A is a schematic illustration of a replaceable component 300 for a liquid pressurization system (e.g. the liquid pressurization system 350 shown and described in FIG. 3B), according to an illustrative embodiment of the invention. The replaceable component 300 includes a body portion 304 and a data storage mechanism 308. The data storage mechanism 308 is in physical communication (e.g., direct physical contact) with the body portion 304 of the replaceable component 300. The data storage mechanism 308 includes information that is usable to determine a remaining useful life of the replaceable component 300. The data storage mechanism 308 is configured to communicate the information to a reader of a liquid pressurization system (e.g., the readers 386, 390 of the liquid pressurization system 350 shown and described in FIG. 3B). In some embodiments, the data storage mechanism 308 is a RFID tag and is configured to communicate with a RFID reader. In some embodiments, the body portion 304 of the replaceable component 300 has a connection mechanism for coupling to a liquid pressurization system 350 (e.g., the liquid pressurization system 350 shown and described in FIG. 3B). In some embodiments, the replaceable component 300 includes an assembly of components or sub-components.

In some embodiments, the information includes a number of hours of operation for the replaceable component 300. In some embodiments, the information includes values measuring other suitable metrics of use of the replaceable component 300, e.g., a number of operational cycles, a number of pressure cycles, a time of operation, a number of pump starts, a measure of detected strain, a measure of fluid exposure, and/or another suitable metric. In some embodiments, the information identifies a type of replaceable component 300 installed and/or a time of installation. In some embodiments, the information conveys an identity of the replaceable component 300, e.g., reflects a part type, a part number, a unique part identifier, and/or an expected life for the replaceable component 300.

In some embodiments, the data storage mechanism 308 includes a sensor (e.g., a temperature sensor, a moisture sensor, and/or a humidity sensor) that provides data about an operating condition of interest (e.g., a sensed temperature, moisture, humidity, and/or a leakage factor) within or near the replaceable component 300. In some embodiments, the data storage mechanism 300 stores values of an operating condition of the replaceable component 300 over time. In some embodiments, data provided by the sensor can be stored directly on the data storage mechanism 308. In some embodiments, the information is capable of being updated and/or supplemented at periodic intervals. In some embodiments, the information is also usable to determine when to replace the replaceable component 300.

In some embodiments, component life can be more accurately predicted when environmental information is known. For example, most high pressure components fail in large part due to fatigue from pressure cycling of the intensifier. A number of pressure cycles of the intensifier and an amplitude of these cycles can be strong predictors of life. For example, a high pressure component cycled several million cycles at 40,000 psi may have 50% life left, whereas the same component cycled at 60,000 psi may be near the end of its expected life. Temperature can be a useful predictor of expected life as well. When a component begins to fail it often allows small amounts of high pressure water to leak by a surface. This leak can generate tremendous heat. As explained herein, a sensor located near the component can detect a rise in temperature, and a moisture sensor can detect the presence of moisture. A reader can then use that information and determine an expected remaining life of the component (e.g., by comparing component life information to tabulated data and/or by using an algorithm to determine remaining life). Usage of tags and readers allows for bulk collection of life and environmental data (e.g., using the "cloud" or remote data storage and processing power, in addition to other methods known in the art). Bulk data can in turn be used to further refine the life prediction models. In some embodiments, the data storage mechanism 308 is located in a low pressure region of the replaceable component 300 or another strategic location. In some embodiments, any metal located between the tag and reader is minimized or eliminated. In some embodiments, the data storage mechanism 308 is located in a low pressure region to prevent it from being damaged and/or corrupted by exposure to high pressures and cycles.

FIG. 3B is a schematic illustration of a liquid pressurization system 350 capable of monitoring replaceable component life and condition as well as "intelligent" batch replacement of replaceable pump components (e.g., one or more replaceable components 300 shown and described in FIG. 3A), according to an illustrative embodiment of the invention. The liquid pressurization system 350 includes a pump 354 (e.g., the pump 100 shown and described in FIG. 1) and a tool 358 for delivering a pressurized liquid. The pump 354 is fluidly connected to the tool 358 and provides a pressurized liquid to the tool 358 for a desired high-pressure application. In some embodiments, the tool 358 is a cutting head, a cleaning device, a pressure vessel and/or an isostatic press. In some embodiments, the tool 358 includes a high pressure liquid inlet and/or an abrasive inlet.

The pump 354 includes a first replaceable component 362 (e.g., the replaceable component 300 shown and described in FIG. 3A). The first replaceable component 362 includes a body portion 366 and a first data storage mechanism 370 in physical contact with the body portion 366. The pump 354 also includes a first reader 386. The first reader 386 can be attached to a non-replaceable portion of the pump 354. The first reader 386 reads information on the first data storage mechanism 370. The information is usable to determine a replacement schedule for the first replaceable component 362.

The liquid pressurization system 350 includes a computing device 394 in communication with the first reader 386. The computing device 394 determines a replacement schedule based on information read from the first data storage mechanism 370. For example, information on the first data storage mechanism 370 can reflect a number of use hours that the first replaceable component 362 has been in operation. The computing device 394 stores expected life information for the first replaceable component 362, e.g., an expected number of use hours that the replaceable component will last before replacement is needed. The computing device 394 compares the information to the expected life information. Comparisons can be performed periodically, e.g., daily and/or at user-specified times.

The computing device 394 generates an alert when the number of use hours approaches the expected life. For example, if the first replaceable component 362 has an expected life of 3,000 use hours, the computing device 394 can generate a user alert when it determines that the first replaceable component 362 has been used for 2,700 hours, or 90% of its expected use life. Generally speaking, replaceable components for high pressure liquid delivery systems can last between about 500 to 3,000 use hours, while some replaceable components last 6,000 or more use hours. In some embodiments, metrics besides use hours (e.g., operational cycles, pressure cycles, and/or other metrics described herein) are used alternatively or in addition to use hours.

In some embodiments, the information reflects identifying information for the first replaceable component 362, e.g., part number, a unique part identifier, and/or an expected life. The first reader 386 then reads the information and/or relays the information to the computing device 394. In some embodiments, the computing device 394 records a time of installation of the replaceable component and tracks a number of use hours that the component is run. In some embodiments, tracking can occur on board the computing device 394. In some embodiments, the computing device 394 generates an alert substantially as described above, e.g., when the first replaceable component 362 has expended a certain predetermined threshold of its expected life.

In some embodiments, the first reader 386 can both read from and write to the first data storage mechanism 370. In some embodiments, information is read from and/or written to the first data storage mechanism 370 using the computing device 394. In some embodiments, the computing device 394 includes a computer numeric controller (CNC) or a pump programmable logic controller (PLC). In some embodiments, the CNC is configured to automate and optimize a cutting operation. In some embodiments, the CNC serves as an operator's interface with the pressurized liquid jut cutting system and includes hardware and/or software to enable cutting parameter and pump setting adjustments. In some embodiments, the CNC controls the motion of a positioning device (e.g., a XYZ cutting table, robotics, conveyor system, etc.) that is configured to position a workpiece and/or the cutting head (not shown) for precise cutting. In some embodiments, the CNC interacts with an abrasive delivery system to meter a precise amount of abrasive for injection into a liquid jet stream produced by the cutting head.

In some embodiments, the pump 354 includes a connector that is connected to the reader 386 and is configured to transmit information to the computing device 394. In some embodiments, the connector is configured to convert information from an analog format to a digital format. In some embodiments, the computing device 394 is wirelessly connected to the first reader 386. In some embodiments, the computing device 394 is located on the pump 354 or remotely. In some embodiments, the computing device 394 is configured to set or adjust at least one operating parameter of the liquid pressurization system based on the information relayed by the first reader 386. For example, an operating pressure could be reduced, and/or a cutting speed slowed down, to extend the life of the component to allow completion of a job or process.

In some embodiments, the first replaceable component 362 includes a sensor (e.g., on the RFID tag or elsewhere) (e.g., to sense temperature, moisture and/or humidity). In some embodiments, the sensor is a temperature sensor. In some embodiments, the first data storage mechanism 370 includes a RFID tag having sensing capabilities. In some embodiments, sensor data can be stored on the first data storage mechanism 370 (e.g., a RFID tag). In some embodiments, a temperature sensor can use the RF capability of the RFID tag to pass information to the RFID reader and upstream to the computing device 394, where it can be used to predict the end of the life of the first replaceable component 362. In some embodiments, the first data storage mechanism 370 stores values of an operating condition over time. In some embodiments, the operating condition is one of a temperature, a pressure, a leakage indicator, moisture information, a number of pressure cycles, a number of operational cycles, a time of operation, a number of pump starts, and/or a measure of detected strain on the first replaceable component 362. In some embodiments, the liquid pressurization system 350 automatically resets the predicted life of the first replaceable component 362 after a new part is installed.

In some embodiments, the liquid pressurization system 350 includes a plurality of replaceable components, data storage mechanisms, and/or readers. For example, in some embodiments the liquid pressurization system 350 includes a second replaceable component 374 and a second reader 390 also in communication with the computing device 394. The second replaceable component 374 includes a body portion 378 and a second data storage mechanism 382 in physical contact with the body portion 378. In some embodiments, the second data storage mechanism 382 is configured to communicate with the second reader 390, e.g., is readable and/or writable by the second reader 390. The information is usable to determine a remaining usable life of the second replaceable component 374. In some embodiments, the second data storage mechanism 382 communicates with the first reader 386, e.g., is readable and/or writable by the first reader 386.

In some embodiments, the computing device 394 determines a replacement schedule for two or more replaceable components (e.g., the replaceable components 362, 374) based on information relayed from multiple replaceable components. In one exemplary embodiment, the first replaceable component 362 is a brand new high pressure cylinder, which can be expected to last about 6,000 use hours, and the second replaceable component 374 is a brand new seal cartridge, which can be expected to last about 650 use hours. In this embodiment, assuming that a seal cartridge is replaced after 650 hours each time it fails, the system will need to be shut down eight times to install new seal cartridges without having to replace the high pressure cylinder. However, at the ninth replacement, the system can also recommend changing the high pressure cylinder to prevent an unneeded system shutdown, as this component would likely fail before the tenth replacement of the seal cartridge. More frequent replacements are needed for configurations that recommend replacements when components reach a certain specified fraction of their expected useful lives, e.g., 90% of their expected useful lives. This embodiment may also contain a third replaceable component that is a check valve body, which can be expected to last about 3,000 use hours. In such a configuration, at the fourth dynamic seal cartridge failure, the system can recommend that the end user also replace the check valve body to prevent another system shutdown.

The system 350 can use data collected over time to improve batch replacement recommendations. For example, as certain replaceable components fail repeatedly, corresponding information can be recorded and averaged over time to produce better estimates of part life (e.g., by tracking the number of use hours of the components before failure, the amplitude of the pressure cycles experienced by the components before failure, or other relevant metrics). In some embodiments, the replaceable components can be any of those described specifically below in FIGS. 4-11. The system 350 can also implement a process as shown and described below in FIG. 12.

FIGS. 4-11 show exemplary key locations in a pump of a liquid pressurization system to which data storage mechanisms and readers can be attached. Data storage mechanisms are denoted with the letter "T" (e.g., a RFID "tag"); readers are denoted by the letter "R" (e.g. "reader"). Generally, tags are placed on replaceable components, and readers are placed on a non-replaceable portion of the pump. The readers can be placed in close proximity to the tags with which they interact to ensure effective communication. One of ordinary skill in the art will realize that it is possible to place tags and readers in additional locations without departing from the spirit and scope of the invention. Table 1 at the end of this description summarizes the exemplary key components and their respective RFID tag and reader locations as shown in FIGS. 4-11. The data storage mechanisms and tags shown in FIGS. 4-11 can function substantially as shown and described above, e.g., in reference to FIGS. 3A-3B.

Figure 4:
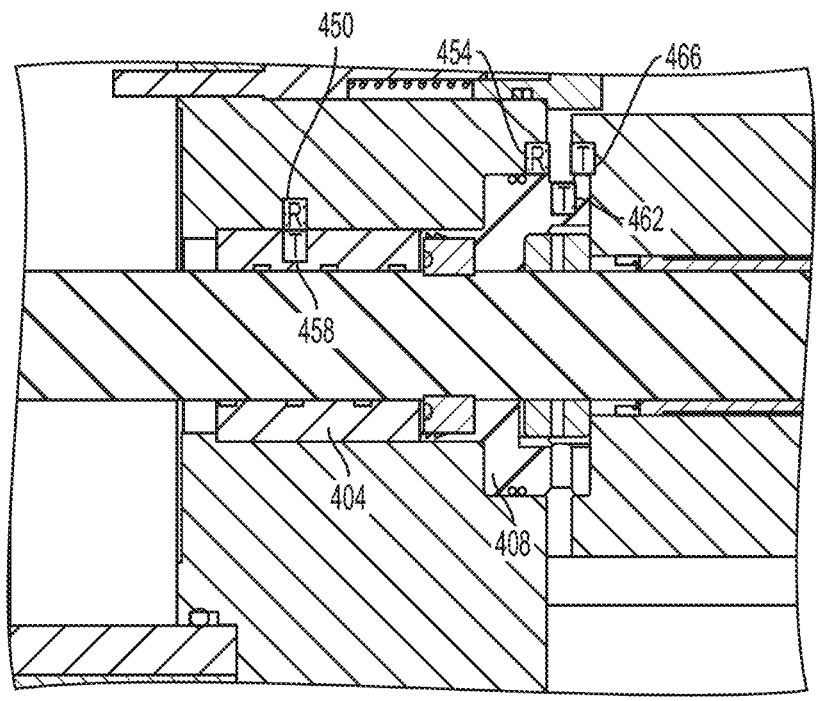
FIG. 4 is a schematic illustration of a hydraulic seal housing and plunger bearing of a pump for a liquid pressurization system, according to an illustrative embodiment of the invention.

FIG. 4 is a schematic illustration of a plunger bearing 404 (e.g. plunger bearing 212 shown above in FIG. 2) and a hydraulic seal housing 408 (e.g. hydraulic seal housing 208 shown above in FIG. 2) of a pump (e.g. a pump including intensifier pump 200 as shown above in FIG. 2) for a liquid pressurization system including RFID readers and tags, according to an illustrative embodiment of the invention. The plunger bearing 404 includes a RFID tag 458. The hydraulic seal housing 408 includes RFID tags 462, 466. The pump includes RFID readers 450, 454. In some embodiments, the RFID readers 450, 454 are attached to a non-replaceable portion of the pump. In some embodiments, the RFID reader 450 communicates with the RFID tag 458. In some embodiments, the RFID reader 454 communicates with the RFID tags 462, 466. In some embodiments, tags are located on replaceable parts and readers are located on non-replaceable portions of a pump subcomponent. In some embodiments, readers and tags are located in low pressure region of pump subcomponents.

Figure 5:
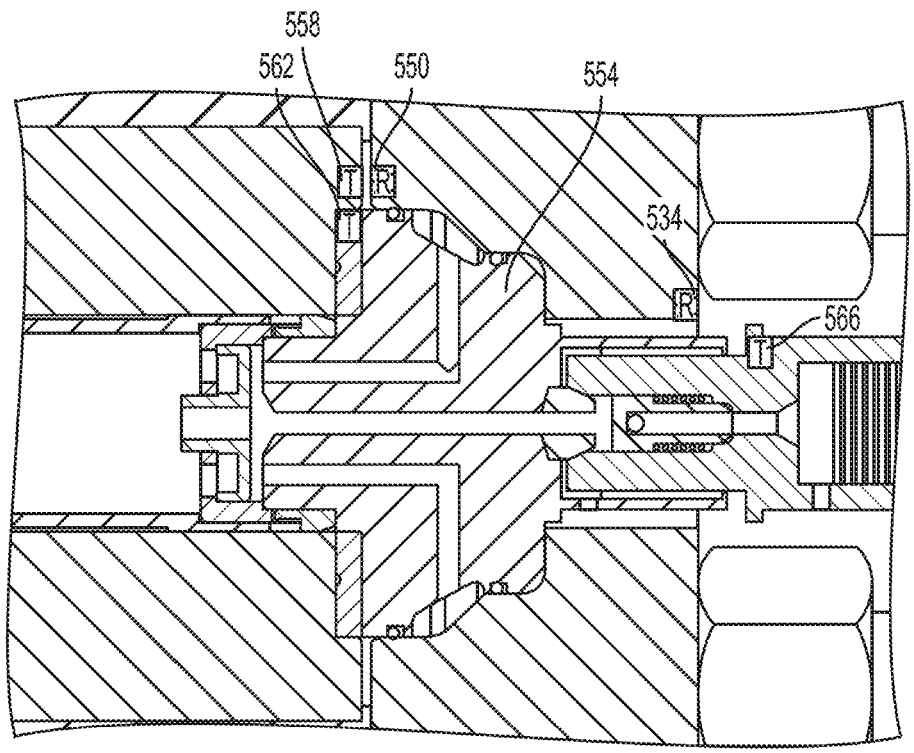
FIG. 5 is a schematic drawing of a check valve of a pump for a liquid pressurization system, according to an illustrative embodiment of the invention.

FIG. 5 is a schematic drawing of a check valve 504 of a pump (e.g. a pump including intensifier pump 200 as shown above in FIG. 2) of a liquid pressurization system including RFID readers and tags, according to an illustrative embodiment of the invention. The check valve 504 includes the tags 558, 562, and/or 566. The pump includes the readers 550, 554. In some embodiments, the reader 554 communicates with the tag 566. In some embodiments, the reader 550 communicates with the tags 558, 562. In some embodiments, the check valve 504 is a single replaceable component which contains the tag(s). In some embodiments, the check valve 504 is an assembly of components. In some embodiments, the tags may be on any one or more of the individual replaceable components.

Figure 6:
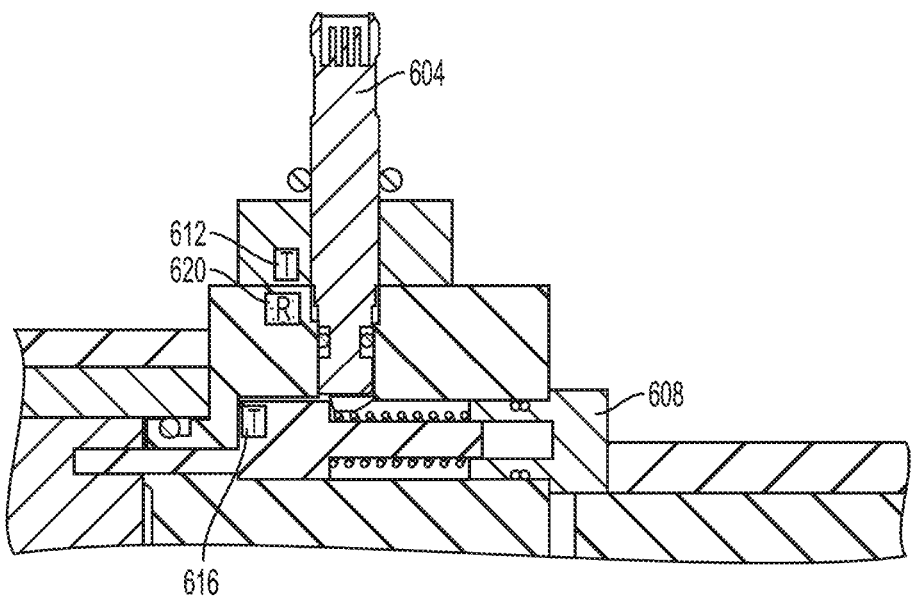
FIG. 6 is a schematic drawing of a proximity switch and an indicator pin of a pump for a liquid pressurization system, according to an illustrative embodiment of the invention.

FIG. 6 is a schematic drawing of a proximity switch 604 and an indicator pin 608 of a pump (e.g. a pump including intensifier pump 200 as shown above in FIG. 2) for a liquid pressurization system including RFID readers and tags, according to an illustrative embodiment of the invention. The proximity switch 604 includes a tag 612. The indicator pin 608 includes a tag 616. The pump includes a reader 620. In some embodiments, the reader 620 communicates with the tag 612 and/or the tag 616.

Figure 7:
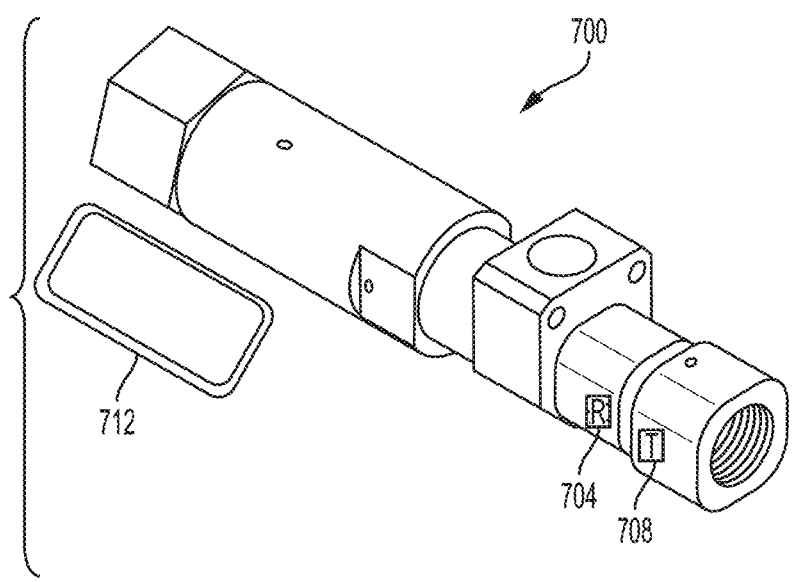
FIG. 7 is a schematic drawing of a bleed down valve of a pump for a liquid pressurization system, according to an illustrative embodiment of the invention.

FIG. 7 is a schematic drawing of a bleed down valve 700 of a pump (e.g. the pump 100 as shown above in FIG. 1) for a liquid pressurization system, according to an illustrative embodiment of the invention. The bleed down valve 700 includes a RFID reader 704, a RFID tag 708, and a reader board 712. In some embodiments, the reader 704 communicates with the tag 708. In some embodiments, the bleed down valve 700 is an assembly of replaceable components.

Figure 8:
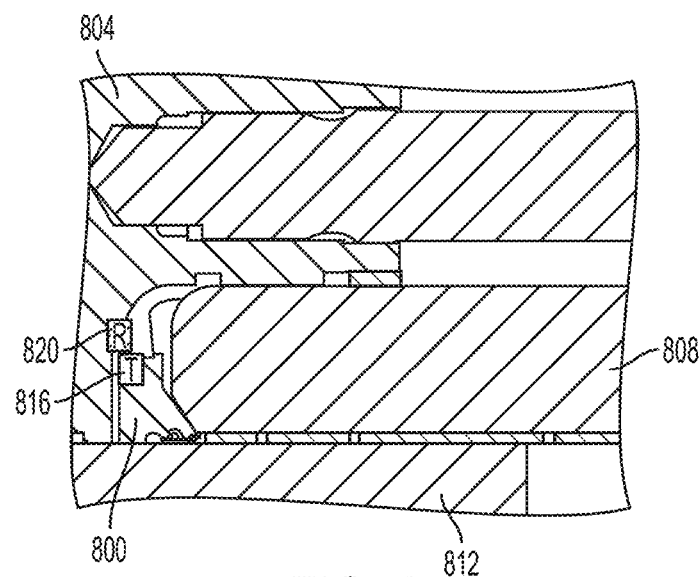
FIG. 8 is a schematic drawing of a seal cartridge, a hydraulic end cap, a high pressure cylinder, and a plunger for a pump for a liquid pressurization system, according to an illustrative embodiment of the invention.

FIG. 8 is a schematic drawing of a seal cartridge 800, a hydraulic end cap 804, a high pressure cylinder 808 and a plunger 812 of a pump (e.g. a pump including intensifier pump 200 as shown above in FIG. 2) for a liquid pressurization system including a RFID reader and tag, according to an illustrative embodiment of the invention. The seal cartridge 800 includes a tag 816. The pump includes a reader 820. In some embodiments, the tag 816 communicates with the reader 820.

Figure 9:
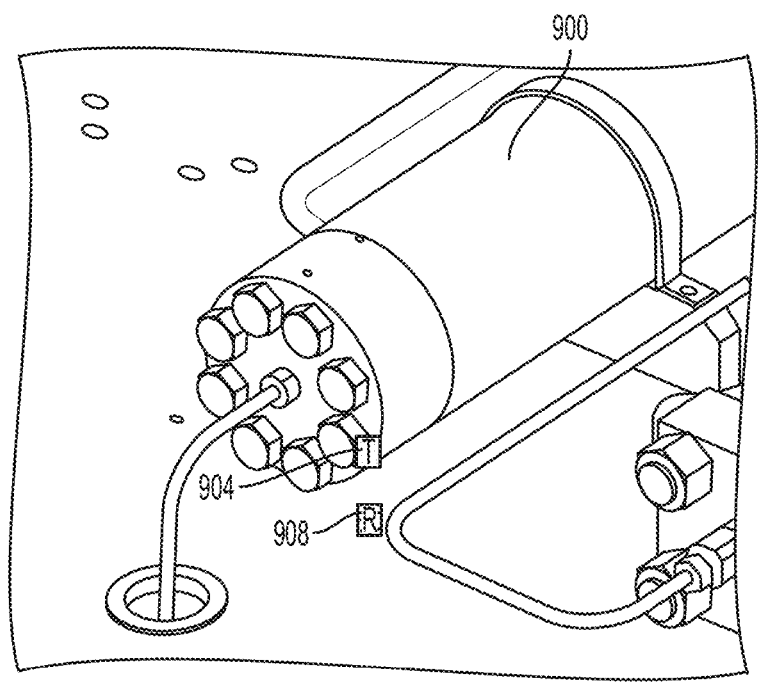
FIG. 9 is a schematic drawing of an attenuator for a pump for a liquid pressurization system, according to an illustrative embodiment of the invention.

FIG. 9 is a schematic drawing of an attenuator 900 (e.g. the attenuator 108 as described above in FIG. 1) for a pump for a liquid pressurization system including a RFID reader and tag, according to an illustrative embodiment of the invention. The attenuator 900 includes a tag 904. The pump includes a reader 908. In some embodiments, the reader 908 communicates with the tag 904.

Figure 10:
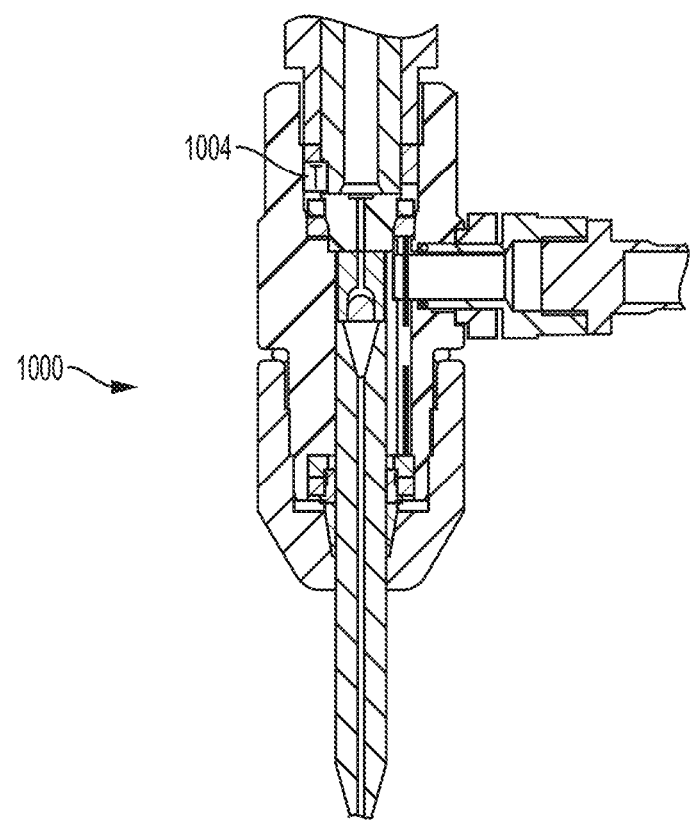
FIG. 10 is a schematic drawing of a cutting head and an adapter for a pump for a liquid pressurization system, according to an illustrative embodiment of the invention.

FIG. 10 is a schematic drawing of a cutting head and adapter, collectively 1000, for a pump for a liquid pressurization system including RFID readers and tags, according to an illustrative embodiment of the invention. The cutting head and adapter 1000 include a tag 1004. The tag 1004 is in communication with a reader (not shown).

Figure 11:
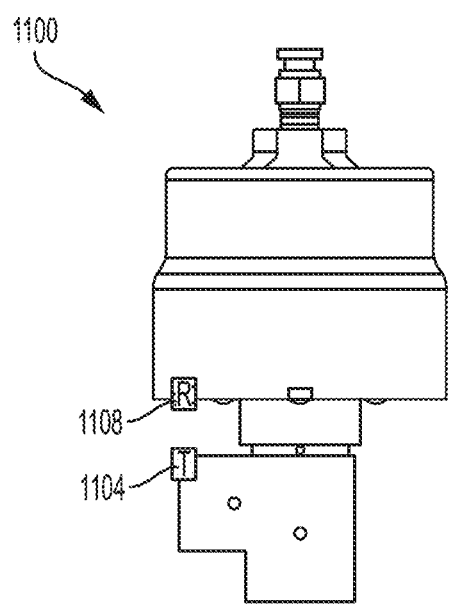
FIG. 11 is a schematic drawing of an on/off valve body for a pump for a liquid pressurization system, according to an illustrative embodiment of the invention.

FIG. 11 is a schematic drawing of an on/off valve body 1100 for a pump (e.g. the pump 100 as described above in FIG. 1) for a liquid pressurization system including a RFID reader and tag, according to an illustrative embodiment of the invention. The valve body 1100 includes a tag 1104. The pump includes a reader 1108. In some embodiments, the reader 1108 is in communication with the tag 1104.

Figure 12:
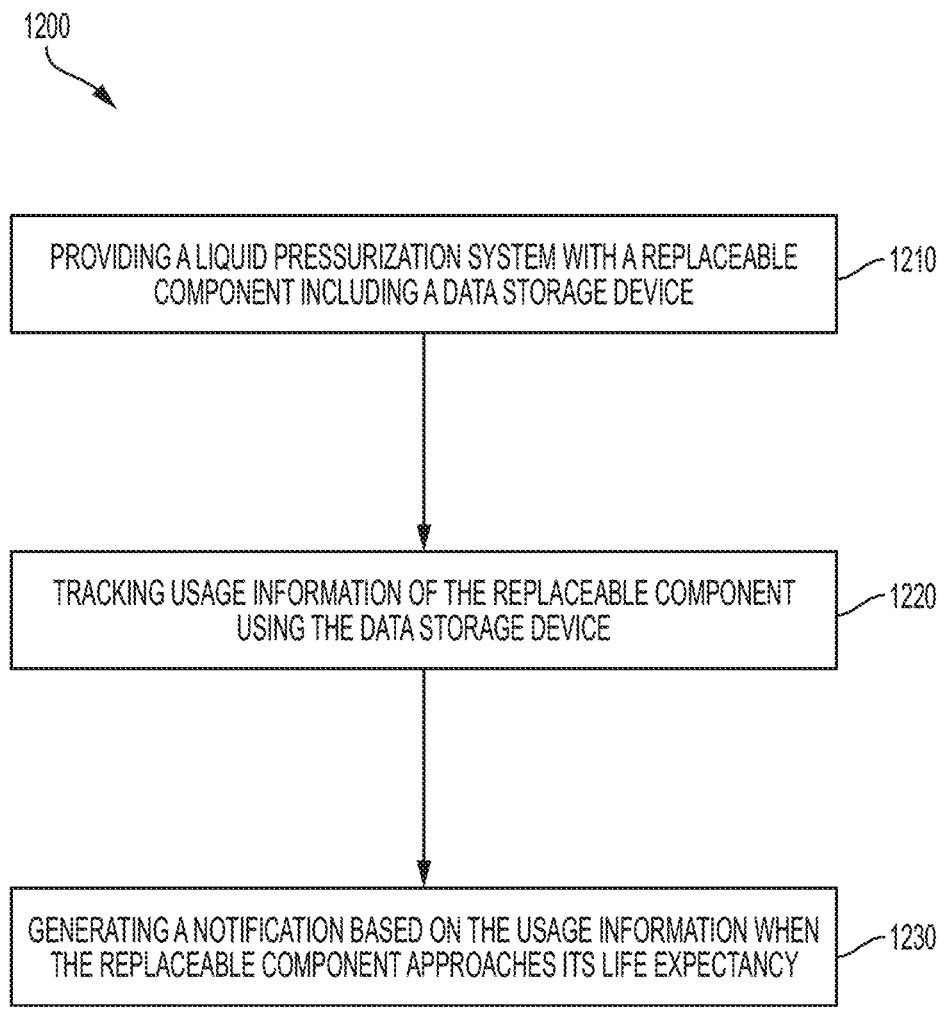
FIG. 12 is a schematic diagram of a process for scheduling a service event for a liquid pressurization system, according to an illustrative embodiment of the invention.

FIG. 12 is a schematic diagram of a process 1200 for scheduling a service event for a liquid pressurization system (e.g., the liquid pressurization system 350 shown and described above in FIG. 3B), according to an illustrative embodiment of the invention. The process 1200 includes a step 1210 of providing a liquid pressurization system with a replaceable component including a data storage device. The process 1200 further includes a step 1220 of tracking usage information of the replaceable component using the data storage device. The process 1200 further includes a step 1230 of generating a notification based on the usage information when the replaceable component approaches its life expectancy.

In some embodiments, the process 1200 further includes comparing the usage information of the replaceable component to life expectancy information for the replaceable component. In some embodiments, the notification is generated after the replaceable component expends at least a certain threshold of its life expectancy, e.g., at least 90% of its life expectancy. In some embodiments, life expectancy is measured in hours of operation. In some embodiments, life expectancy is measured in, or is affected by, another suitable metric, e.g., as described herein or as is known in the art. In some embodiments, comparing usage information with expected life information includes comparing specific values for each relevant use metric with tabulated values reflecting the expected life for the replaceable component. In some embodiments, the tabulated expected life values are updated and/or iteratively better defined as further data are gathered over time. In some embodiments usage data is run through an algorithm to determine remaining life. In some embodiments, tracking usage information includes recording data on the data storage device and/or reading data from the data storage device. Recording can be accomplished using the "reader" to write information to a tag and/or by storing the information remotely.

In some embodiments, the process further includes (v) providing a plurality of replaceable components on or in the liquid pressurization system, each replaceable component including a data storage device for tracking usage information for each replaceable component. In some embodiments, the method further includes (vi) planning an outage of the liquid pressurization system based on usage information for the plurality of replaceable components. In some embodiments, the method further includes (vii) determining whether each of the plurality of replaceable components should be replaced during a given outage based on the usage information for each replaceable component. For example, when one replaceable component fails and necessitates a system shut-down, the method can include further determining whether any other replaceable components should be replaced during that outage. In some embodiments, operating parameters of the system (e.g., cutting pressure and speed) can be adjusted to suboptimal levels to complete the cut while the system is fading (e.g., akin to a "battery save" mode on a laptop).

Component replacement schemes can be determined using a cost optimization algorithm that accounts for the total costs of replacement over time and schedules batch replacements that minimize these costs. Several considerations may inform such an algorithm. On the one hand, fixed costs are incurred each time a batch replacement is performed, including costs to pay repair personnel and costs of lost productivity while the system is down. This consideration weighs in favor of batching replacement of components to the extent possible. On the other hand, there is also a cost of "wasted" materials associated with replacing components that still have a useful life remaining. These costs accumulate over time if many components are not used to their full potential. This consideration weighs in favor of keeping components in place as long as possible, e.g., if they are likely to survive until the next replacement cycle.

In some embodiments, cost variables may be multiplied by a probability factor that represents the likelihood of incurring the cost, e.g., since failure of replaceable components cannot be predicted with absolute certainty. For example, if a component is 80% likely to fail before the next batch replacement, this likelihood should be taken into account. As more data is gathered over time, trends can be analyzed to build an iteratively better understanding of the variables influencing useful life, the quantitative values of useful life along certain metrics (e.g., the expected use hours for a particular replaceable component), and the variance in these values (e.g., useful life for component X is 95% likely to be 3000 hours, plus or minus 50 hours). This better understanding will, in turn, help shed light on which metrics more reliably determine useful life. The process of iterative refinement will continue until a stable probabilistic assessment of failure for a given set of replaceable components is reached.

Figure 13:
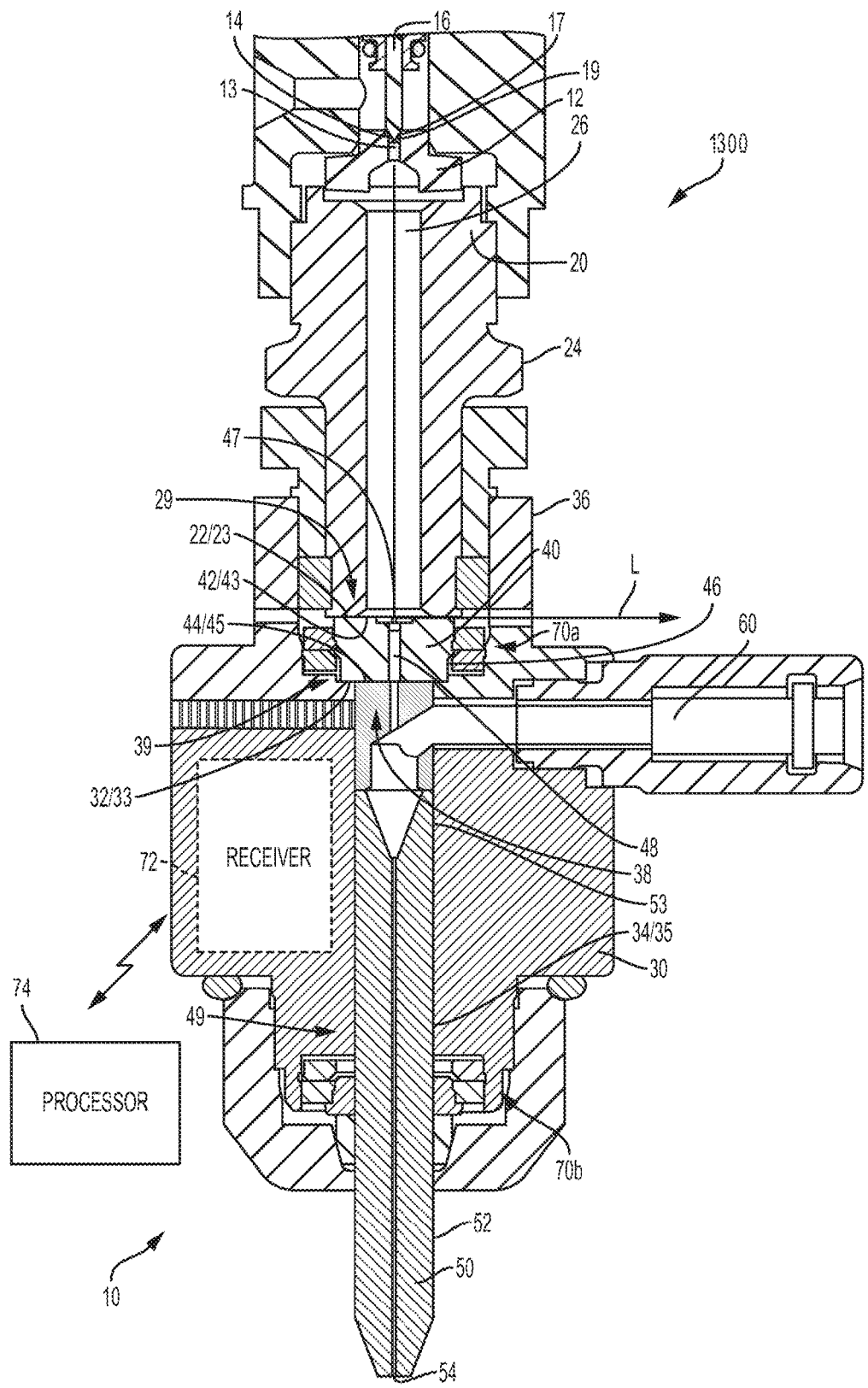
FIG. 13 is a schematic diagram depicting a cross-sectional front view of a cutting head for a pressurized liquid jet cutting system, according to an illustrative embodiment of the invention.

FIG. 13 is a schematic drawing depicting a cross-sectional front view of a cutting head 1300 for a pressurized liquid jet cutting system. Embodiments of the cutting head 1300 may comprise various structural and functional system components that complement one another to provide the unique functionality and performance of the cutting head 1300 and the pressurized liquid jet cutting system.

Figure 14:
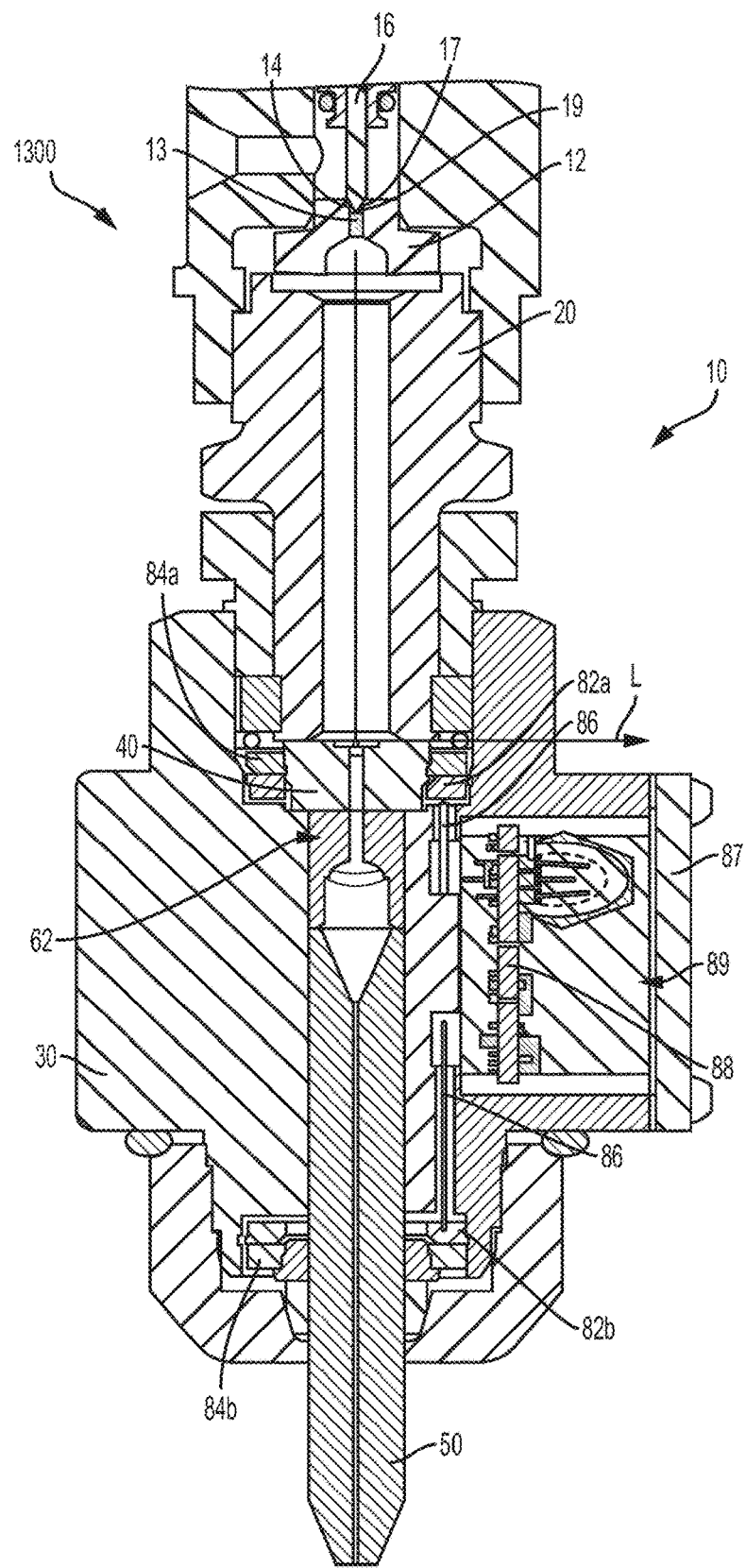
FIG. 14 is a schematic diagram depicting a cross-section side view of the cutting head of FIG. 13, according to an illustrative embodiment of the invention.

With reference to FIGS. 13 and 14, embodiments of the cutting head 1300 may comprise a body 10. The body 10 includes an adapter 20, a housing 30, an orifice holder 40, and/or a nozzle 50, among other component parts. These various component parts are configured to releasably couple to one another to comprise the body 10 of the cutting head 1300. The body 10 is configured to receive therein and therethrough a high-pressure liquid flow and direct the liquid flow onto a workpiece (not depicted). The body 10 is configured to releasably couple to the positioning device as part of the pressurized liquid jet cutting system. In some embodiments, the body 10 comprises rigid materials that are capable of withstanding pressurized liquid flows, such as metal and metal alloys, plastic and plastic alloys, ceramics, composites, any combinations thereof, or other like materials.

In some embodiments, the cutting head comprises the adapter 20, an elongated member having at least a distal end 22, an exterior surface 24 and an inlet 26. The adapter 20 is a substantially cylindrical member, having portions thereof assume a cylindrical shape. The inlet 26 is an elongated through bore that runs the entire length of the adapter 20, such that the adapter 20 is open on each of its ends-a first end that allows the adapter 20 to releasably couple to the positioning member or another component part of the larger material processing system, and an opposing second end, which is the distal end 22. The inlet 26 is a substantially cylindrical shape and configured to receive a pressurized flow or source of liquid and direct the pressurized flow through the adapter 20 toward the distal end 22. The distal end 22 of the adapter 20 is configured to have portions thereof that are an interface, sealing, or engagement surface 23 that are designed and configured to physically, functionally, and operationally communicate with, cooperate with, contact, or otherwise interface with or engage other surfaces within the body 10 to seal or effectively prevent the pressurized liquid flow from passing between the engagement surface 23 and other surfaces in contact therewith.

In some embodiments, the adapter 20 comprises an exterior surface 24 exposed to ambient air, thus constituting an exterior surface of the body 10, and/or the exterior surface 24 contacts, is coupled to, or is inserted within other component parts of the body 10, such that the exterior surface 24 of the adapter 20 is actually an interior surface of the body 10. For example, the exterior surface 24 near the distal end 22 is configured to releasably couple to a fastening member, a housing 30, or another component part of the body 10, such that these other component parts at least partially overlap some portion of the exterior surface 24 of the adapter 20, thus making the exterior surface 24 of the adapter 20 an interior surface of the body 10.

Embodiments of the cutting head 1300 comprise the orifice holder 40. The orifice holder 40 is a member having substantially cylindrical outer or exterior surface(s) 46, as well as first and second end surfaces, 42 and 44, that oppose one another in a flow direction of the pressurized liquid. The orifice holder 40 is configured in the flow path of the pressurized liquid, such that the first end surface 42 engages the pressurized liquid flow. Moreover, similarly to the distal end 22, portions of the first end surface 42 are an engagement surface portion 43, or an interface or sealing surface. These engagement surface portion(s) 43 of the first end surface 42 are configured to physically, functionally, and operationally communicate with, cooperate with, interface with, contact, or otherwise engage at a junction 29 the engagement surface portion(s) 23 of the distal end 22. In other words, the engagement surface portion(s) 23 of the distal end 22 and the engagement surface portion(s) 43 of the first end surface 42 engage one another, for example, by friction fit, to seal or effectively prevent the pressurized liquid flow from passing therebetween, and in particular to effectively fluidically seal the junction 29 that exists because of the physical interaction between the adapter 20 and the orifice holder 40.

In some embodiments, the orifice holder 40 includes a portion thereof located centrally in the first end surface 42 that engages, houses, holds, sustains, or otherwise supports an orifice gem 47. The orifice gem 47 is configured to focus or otherwise constrict the flow of the pressurized liquid through the body 10. For example, the orifice gem 47 has a type of pin-hole therethrough (not depicted) that functions to reduce the area through which the pressurized liquid flows. The size of the pin-hole varies depending on the material property and thickness of the workpiece being cut and is usually between 0.003 to 0.025 inches. According to principles of the Venturi effect, as the area through which the pressurized liquid flows decreases (i.e., pin hole of the orifice gem 47) the velocity of the liquid increases; consequently, the pressurized flow of liquid through the orifice gem 47 (in addition to the other components of the cutting head 1300) results in a high-velocity liquid jet stream capable of operating on a workpiece, such as cutting entirely through or engraving upon the surfaces of the workpiece.

In relation thereto, the orifice holder 40 comprises an internal conduit 48 running the entire length thereof from the first end surface 42 to the second end surface 44, the conduit 48 being oriented in a parallel configuration with the direction of flow of the pressurized liquid jet and configured to receive the flow of the pressurized liquid jet from the orifice gem 47 to direct the liquid jet through the orifice holder 40 and into the nozzle 50. Accordingly, the conduit 48 is a size and shape to cooperate with the size and shape of the orifice gem 47, and in most cases the size and shape of the conduit 48 is slightly larger than the diameter of the pin-hole of the orifice gem 47 so that the walls of the conduit 48 do not interfere with the high velocity liquid jet stream. Moreover, the axis of the pin-type hole of the orifice gem 47 and the axis of the conduit 48 is axially aligned with one another to reduce interference or disruption of the liquid flow therethrough.

In other embodiments, the orifice holder 40 further comprises portions of the second end 44 that are an engagement surface 45 designed to physically, functionally, and operationally communicate with, cooperate with, contact, or otherwise engage other surfaces within the body 10 to seal or effectively prevent fluid from the high velocity liquid jet stream from passing between the engagement surface 45 and other surfaces in contact therewith.

Embodiments of the cutting head 1300 further comprise a housing 30. The housing 30 is a member configured to functionally support, carry, or otherwise sustain the adapter 20, the orifice holder 40, and the nozzle 50. For example, the housing 30 is configured to functionally engage the adapter 20 to secure, support, or otherwise maintain the adapter 20 and the housing 30 in a releasably coupled configuration with the orifice holder 40 positioned between the housing 30 and the adapter 20. The housing 30 comprises an interior lip 32 configured to engage portions of the second end 44 of the orifice holder 40. The interior lip 32 has portions thereof that function as an interface or engagement surface portion 33. These engagement surface portion(s) 33 of the interior lip 32 of the housing 30 are configured to physically, functionally, and operationally communicate with, cooperate with, interface with, contact, or otherwise engage at a junction 39 the engagement surface portion(s) 45 of the second end 44 of the orifice holder 40. In other words, the engagement surface portion(s) 33 of the interior lip 32 and the engagement surface portion(s) 45 of the second end surface 45 engage one another, for example, by friction fit, to seal or effectively prevent the high velocity liquid jet stream from passing therebetween, and in particular to effectively fluidically seal the junction 39 that exists because of the physical interaction between the orifice holder 40 and the housing 30.

Proximate the interior lip 32, the housing 30 further defines a mixing chamber 38. In some embodiments, the mixing chamber 38 is an opening, void or bore in a centralized portion of the housing 30. The mixing chamber 38 is configured to communicate with the orifice holder 40 and specifically the second end 44 of the orifice holder 40. The conduit 48 in the orifice holder 40 is configured to open up into the mixing chamber 38 such that the pressurized liquid jet that exits the orifice holder 40 at the second end 44 immediately enters the mixing chamber 38.

The housing 30 is additionally configured to engage an abrasive inlet 60. The abrasive inlet 60 is an optional component part that is coupled to an abrasive delivery system (not depicted), which is part of the pressurized liquid jet cutting system. The abrasive delivery system is configured to meter a precise amount of abrasive for injection into the pressurized liquid jet stream through the abrasive inlet 60 at the mixing chamber 38, such that the abrasive and the liquid can begin to mix together as one. As the liquid jet stream moves quickly through the mixing chamber 38, a Venturi effect is created, where the liquid pulls the abrasive into itself. The combined abrasive and liquid thereafter enters the nozzle 50, which functions as an additional mixing tube of sorts by providing an elongated space (e.g., 2 to 4 inches) for the liquid and abrasive to mix prior to exiting the nozzle 50 at the opening 54 and reaching the workpiece.

In other embodiments, the housing 30 further comprises an interior surface 34 that functions to functionally or operationally engage the exterior surface 52 of the nozzle 50, such that the interior surface 34 of the housing 30 secures, supports, fixes, or otherwise maintains the nozzle 50 in a releasably coupled configuration with the housing 30. To do so, the interior surface 34 has portions thereof that function as an interface, sealing, or engagement surface portion 35, and the exterior surface 52 has portions thereof that function as an interface, sealing, or engagement surface portion 53. The engagement surface portion(s) 35 of the housing 30 and the engagement surface portions 53 of the nozzle 50 are configured to physically, functionally, and operationally communicate with, cooperate with, interface with, contact, or otherwise engage one another at a junction 49. In other words, the engagement surface portion(s) 35 of the interior surface 34 and the engagement surface portion(s) 53 of the exterior surface 52 engage one another, for example, by friction fit, to effectively prevent the high velocity liquid jet stream from passing therebetween, and in particular to effectively fluidically seal the junction 49 that exists because of the physical interaction between the housing 30 and the nozzle 50.

Embodiments of the cutting head 1300 further comprise a valve seat 12 and a valve needle 16. The valve seat 12 is configured to releasably couple to the adapter 20 proximate the beginning of the inlet 26. The valve seat 12 comprises a bore 13 in the centralized portion thereof. The valve needle 16 is configured to communicate with the bore 13 of the valve seat 12, such that the valve needle 16 is able to move into contact with the bore 13 and out of contact with the bore 13. When in contact with the bore 13, the valve needle 16 functions to prevent the flow of the pressurized fluid from entering the valve seat 12 and the adapter 20. As such the bore 13 has interface, sealing, or engagement portions 14 thereof that are configured to communicate with, interface with, or seal together with the corresponding interface, sealing, or engagement portions 17 of the valve needle 16, such that when the respective engagement portions 14 and 17 contact, interface with, or engage one another, they seal or effectively prevent the pressurized liquid flow from passing therebetween, and in particular to effectively fluidically seal the junction 19 that exists because of the physical interaction between the valve seat 12 and the valve needle 16.

Figure 15:
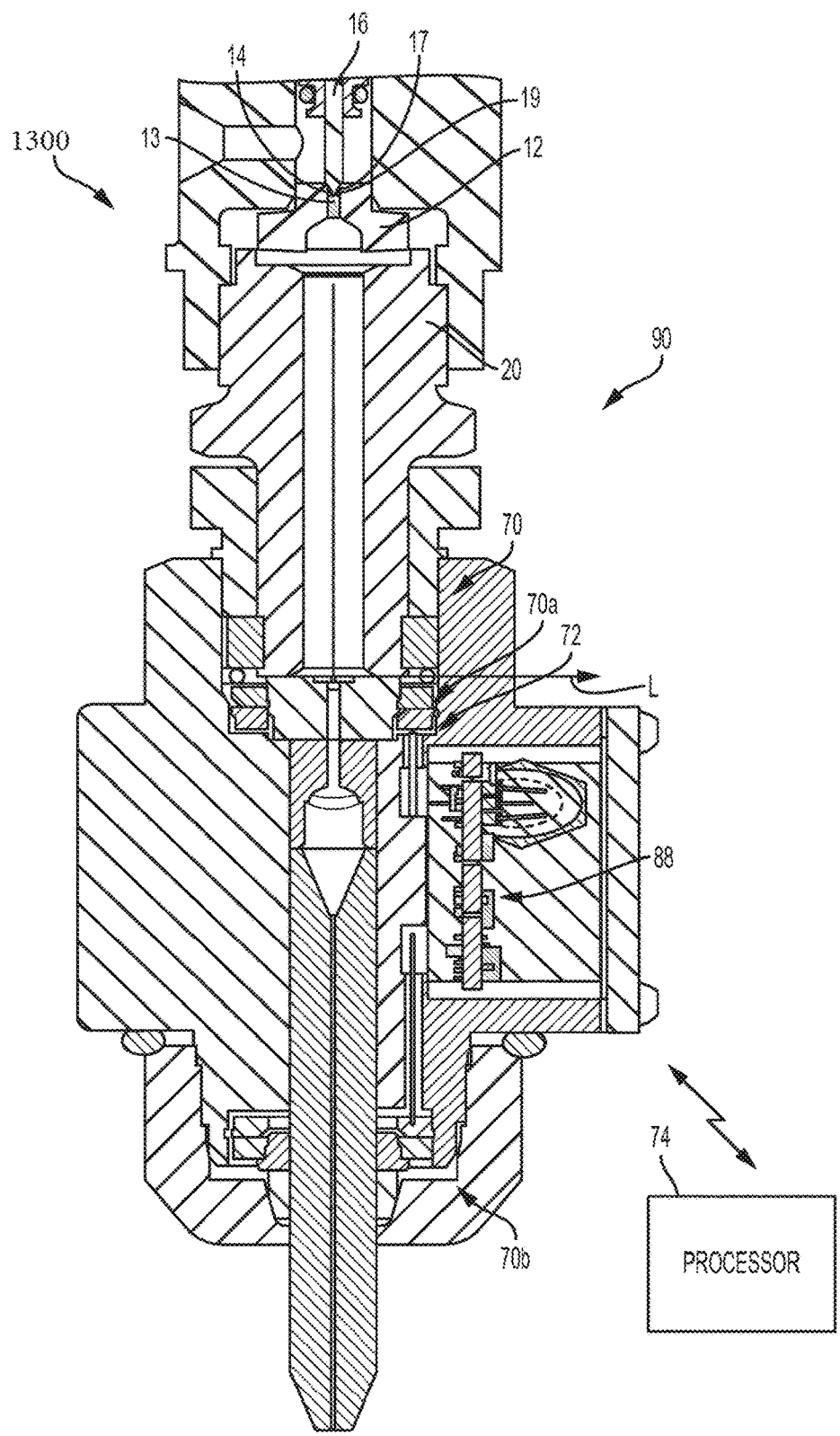
FIG. 15 is a schematic diagram depicting another cross-section side view of the cutting head of FIG. 13, according to an illustrative embodiment of the invention.

FIG. 15 depicts an exemplary communication network 90 associated with the cutting head 1300. The communication network 90 includes one or more signal devices 70 (e.g., 70a and 70b), each assigned to one or more components of the cutting head 1300. For example, the signal device 70a is assigned to the orifice holder 40 and the signal device 70b is assigned to the nozzle 50. Each signal device 70 is adapted to transmit a signal associated with the respective component part to a receiver 72. In some embodiments, each signal device 70 is an electrically writable device configured to transmit information about the respective component part in the form of one or more signals. In some embodiments, each signal device 70 is a radio-frequency identification (RFID) tag or card, bar code label or tag, integrated circuit (IC) plate, or the like. In some embodiments, a signal device 70 is a detector (e.g., a sensor) for detecting a physical characteristic of the component part and transmitting the detected information in the form of one or more signals. The communication network 90 also includes at least one receiver 72 for: i) receiving signals transmitted by at least one of the signal devices 70; ii) extracting data conveyed by the signals; iii) providing the extracted data to a processor 74 for analysis and further action; and (iv) writing data to one or more of the signal devices 70 as instructed by the processor 74. In some embodiments, the processor 74 is a digital signal processor (DSP), microprocessor, microcontroller, computer, computer numeric controller (CNC) machine tool, programmable logic controller (PLC), application-specific integrated circuit (ASIC), or the like. The processor 74 is integrated with the larger material processing system, such as within the CNC, or can be a stand-alone computing device.

Embodiments of the cutting head 1300 comprise the signal device 70 being encoded with information pertaining to the component part to which the signal device 70 is assigned. The encoded information is generic or fixed information such as the component part's name, trademark, manufacturer, serial number, and/or type. The encoded information, for example, includes a model number to generally indicate the type of the component part, such that the component part is an orifice assembly or a nozzle. In some embodiments, the encoded information is unique to the component part, such as material composition of the component part, material properties of the component part (e.g., thermal conductivity), weight of the component part, date, time and/or location at which the component part was manufactured, personnel responsible for the component part, and the like. As an example, the encoded information provides a serial number, which is unique to each component part manufactured, to distinguish, for example, nozzle Type A, Serial #1 from nozzle Type A, Serial #2. As another example, the signal device 70a can stores information related to the opening size of the orifice holder 40 and the signal device 70b stores information related to the opening size of the nozzle 50.

In some embodiments, information is encoded to a signal device 70 at the time of manufacture of the corresponding component part. Information is also encoded to a signal device 70 during the lifetime of the component part, such as after each component part use. Encoded information includes the date, time, duration, and location of component part use, any abnormalities detected during use, and/or component part conditions after use.

In some embodiments, a signal device 70 is writable once, for example, to encode information about a component part when the component part is first manufactured. In some embodiments, a signal device 70 is writable multiple times, such as throughout the lifespan of the corresponding component part.

In some embodiments, each of the signal devices 70 is located inside of the cutting head 1300 (e.g., on an interior surface of the cutting head body 10) and/or on a component part of the cutting head 100. For example, a signal device 70 is attached to a surface of a component part that is ultimately installed inside of the cutting head 1300. In an exemplary configuration, the signal device 70a for storing information about the orifice holder 40 is located on a surface of the orifice holder 40, such as the exterior surface 46, while the signal device 70b for storing information about the nozzle 50 is located on the exterior surface 52 of the nozzle 50. In some embodiments, both signal devices 70a, 70b are placed in low pressure regions of the cutting head 100 to minimize exposure to high pressure liquid during cut operations. Further in example, a signal device 70 is positioned or attached to an exterior surface of a component part of the cutting head 1300, such as the exterior surface 24 of the adapter 20, the exterior surface 36 of the housing 30, and/or the exterior surface 52 of the nozzle 50. Even further, a signal device 70 is positioned remotely from the cutting head 1300 but configured to measure a physical characteristic of a portion of, and/or component part of, the cutting head 1300.

In some embodiments, a signal device 70 is designed to be durable, i.e., functional during and after one or more cutting operations. For example, the signal device 70a is sufficiently robust to withstand ultrasonic cleaning of the orifice holder 40 to remove deposits. In some embodiments, certain cleaner is used to avoid harming the signal device 70a. In some embodiments, a signal device 70 is disposable after each cutting operation or after several operations.

Each of the signal devices 70 is configured to wirelessly transmit its stored information to the receiver 72 in the form of one or more signals. The receiver 72 is adapted to process signals from each signal device 70 to extract pertinent data about the component part corresponding to the signal device 70 and forward the data to the processor 74 for analysis. In some embodiments, the receiver 72 is located in or on the cutting head 100. For example, the receiver 72 is located in the cutting head 1300 close to the signal device 70, such as in the housing 30 and/or on an internal surface of the cutting head body 10. In some embodiments, the receiver 72 is at a location external to the cutting head 1300, such as attached to the processor 74.

In some embodiments, the signal devices 70 are RFID tags, in which case the receiver 72 is a reader 82 used to interrogate one or both of the RFID tags 84*a*, 84*b*. Each of the readers 82*a*, 82*b* and corresponding tag 84*a*, 84*b* includes an antenna for receiving and transmitting signals. The reader(s) 82 include: (1) an antenna for transmitting RF signals to the RFID tag 84 to communicate with and/or interrogate the tag 84; and (2) components for decoding a response transmitted by the RFID tag 84 before forwarding the response to the processor 74. The RFID tag is configured to be either active or passive. An active RFID tag includes a battery to produce a stronger electromagnetic return signal to the reader, thereby increasing the possible transmission distance between the RFID tag and the reader. The distance between an RFID tag and a reader ranges from proximate one another to 100 feet or more, depending on the power output, the radio frequency used and the type of material through which the RF signals need to travel. Using an RFID tag is advantageous because it does not require direct contact (e.g., via wires) or direct line of sight (e.g., via optical signals) with the reader and is well suited for use in harsh environments.

Another component in an RFID communication system is an interface board 88 (e.g., a printed circuit board) that implements middleware application for connecting the data from a reader 82 to an external host software system. The interface board 88 is configured to perform one or more of the following functions: retrieving data from one or more readers 82, filtering data feeds to external application software, monitoring tag 84 and reader 82 network performance, capturing history, and converting analog signals received from a reader 82 to digital signals for external transmission. Yet another component in an RFID communication system is a connector (not depicted) configured to transmit the digital signal from the interface board 88 to the external host software system. In some embodiments, one reader 82 is used to interact with multiple RFID tags 84. Alternatively, multiple readers 82 are used, each interacting with a respective one of the RFID tags 84*a*, 84*b*. In some embodiments, a single interface board 88 is used to connect information from one or more readers 82 to an external processor 74. Alternatively, multiple interface boards 88 are used to connect respective ones of readers 82 to an external processor 74. In some embodiments, the interface board 88 is equipped with wireless connectivity components to facilitate wirelessly communication with the processor 74 to thereby transfer data and signals therebetween. In some embodiments, the processor 74 is a controller, such as the controller of the CNC. In some embodiments the processor 74 is a controller embodied in a PC or other computer equipped for data analysis, program execution, and other computer-implemented actions.

FIGS. 13, 14, and 15 depict an exemplary design of a cutting head for housing an RFID communication system, such as for the cutting head 1300. FIG. 14 shows a cavity, void, or space 89 within, or defined, by the housing 30. The interface board 88 is positioned within the space 89 and wires 86 runs through channels within the housing 30, the wires 86 configured to electrically couple the readers 82*a*, 82*b* with the interface board 88 to establish communication between the signal device(s) 70 and the interface board 88. The space 89 is adapted to be fluidically sealed so that liquid does not enter and interfere with the operational aspects of the RFID communication system. For example, the housing 30 further comprises a cap 87 configured to releasably couple to the housing 30 and fluidically seal the space 89. Further, when the cap 87 is removed from the housing 30, access is provided to the internal components within the space 89, such as the interface board 88 and associated component parts. Additionally, in some embodiments, one or more sealing members (not depicted), such as a flexible neoprene gasket, are employed in the channels or other entry points into the space 89 to prevent liquid (e.g., water) from seeping into the space 89 where the interface board 88 resides. The gasket(s) include an opening to allow the wires 86 to pass therethrough while providing a waterproof seal.

Advantages of the communication network 90 being incorporated into a pressurized liquid jet cutting head, such as cutting head 1300, include the processor 74 being adapted to automatically configure at least one operating parameter of the cutting head 1300 based on the information encoded in or obtained by the one or more signal devices 70. For example, due to the use of abrasive in the liquid jet, the opening of the nozzle 50 may grow with time, thus affecting quality of cutting operations. Therefore, the signal device 70*b* associated with the nozzle 50 stories configured to store the size of the opening 54 of the nozzle 50, thus allowing the processor 74 to predict its growth and automatically adjust certain operating parameters, such as the kerf setting, to compensate for the predicted growth. As another example, the size of the pin-hole of the orifice gem 47 is correlated to the stroke rate of a pump (not depicted) that creates a stream of high pressure liquid. Hence, the processor 74 uses the pin-hole size information of the orifice gem 47 stored in the signal device 70*a* to predict the pump stroke rate. Accordingly, information stored on each or both of the signal devices 70 can be used by the processor 74 to perform the following adjustments: (i) adjust the composition/amount of additives into the liquid jet by interacting with the abrasive delivery system; (ii) adjust the positioning of the workpiece in relation to the cutting head 100 by adjusting the positioning device; and/or (iii) change the stroke rate of the pump. In some embodiments, the combination of information stored in the signal devices 70 allows the processor 74 to set up one or more of the cutting parameters automatically so as to optimize the efficiency and maximize the lifespan of the nozzle 50 and/or the orifice holder 40.

In additional embodiments, the signal devices 70 further comprise thermal sensors, such as infrared (IR), conductive, and convective thermal sensors, and the information obtained by the one or more signal devices 70 includes thermal information, such as temperature. In other words, the signal devices 70 are adapted to sense and/or obtain a temperature reading/measurement of a portion of, or component part of, the cutting head 100 with which the signal device 70 is associated. In some embodiments, the signal device 70 configured with thermal sensing capability is a direct temperature sensor in contact with a specific portion of, or component part of, the cutting head 1300. In other embodiments, the signal device 70 configured with thermal sensing capability is an indirect temperature sensor configured to measure at a distance a temperature of a specific portion of, or component part of, the cutting head 1300.

Measuring and monitoring the temperature of the cutting head 1300 is an important indicator of performance. Under normal operating conditions, a cutting head, such as cutting head 1300 generates some expected amount of heat due to the pressure of the liquid, the velocity of the liquid generated by the orifice gem 47 and orifice holder 40, and, at times, the abrasive added to the pressurized liquid jet stream. The anticipated heat, or change in temperature, is primarily caused by the friction between the pressurized liquid moving through the cutting head 1300 and its component parts, as described herein. However, when a cutting head, such as cutting head 1300, develops a leak hole or undesired and unexpected opening in the body 10, portions of the pressurized liquid jet stream begin to travel through the leak hole and into unwanted portions of the cutting head 1300. The resulting undesirable and inefficient performance of the cutting head 1300 and increased friction therein can cause temperature change, including causing temperature levels of the component parts within the cutting head 1300 to rise beyond satisfactory or acceptable levels. In addition, the anticipated heat can also be caused by the addition of the abrasive material to the liquid jet stream. Accordingly, the addition or subtraction of the abrasive material from the liquid jet stream can also cause temperature changes that can be detected.

Leaks in the cutting head 1300 are caused by many reasons, including damage to the sealing surfaces between component parts and/or inadequately tightening of the adapter 20, the housing 30, the nozzle 50, and/or the abrasive inlet 60 with one another, just to name a few. Leaks are also caused by a misalignment of component parts with one another, such as, but not limited to, the adapter 20, the housing 30, the nozzle 50, and/or the abrasive inlet 60. A misalignment consists of the engagement, interface or sealing surfaces of one or more of the component parts being slightly offset or incongruent, such that a liquid seal is not established, or not completely established, between component parts. Alternatively, a misalignment consists of the component parts not being axially aligned with one another upon assembly of the cutting head 1300. The axial misalignment causes the situation described above where the engagement, interface or sealing surfaces of one or more of the component parts are slightly offset or incongruent, such that a liquid seal is not established, or not completely established, between one or more of these component parts.

Also, when leaks develop, the high pressure pushes the liquid through the leak and into parts of the cutting head 100 that are not normally accustomed to liquid and even into portions where liquid damages other component parts, such as, for example, the communication network 90 and its associated electronic components. The electric component parts are also susceptible to damage from high or extreme temperatures and/or prolonged exposure to elevated temperatures produced by the leak.

Embodiments of the cutting head 1300 comprise the signal devices 70 being configured to sense and/or obtain a temperature reading of a portion of, and/or a component part of, the cutting head 1300 with which the signal device 70 is associated, report the information to the interface board 88, and transmit the information to the processor 74 for further action, including the processor 74 shutting down the cutting head 1300 to preserve the component parts of the cutting head 1300. Moreover, the positional location of the particular signal device 70 that detects the temperature rise in the cutting head 1300 may also assists the processor 74 and/or user to begin to identify where the leak occurred on the cutting head 1300.

As disclosed herein, in some embodiments, a signal device 70 is a detector (e.g., a sensor) for detecting a physical characteristic of the component part and transmitting the detected information in the form of one or more signals. In some embodiments, the physical characteristic of the component part to be detected is a temperature value. In some embodiments, the signal device 70 is one or more types of sensor for sensing temperature value or variation in temperature. For example, the signal device 70 is an indirect temperature sensor, such as an IR sensor or a convective sensor. These types of sensors permit the signal device 70 to be positioned remotely from the cutting head 1300 and yet positioned appropriately to measure the temperature of one or more locations, or parts, of the cutting head 1300, such as, for example, the adapter 20, the housing 30, and/or positions on the cutting head 1300 proximate the internal junctions 29 and 39 between the adapter 20, the orifice holder 40, and the housing 30. Once the temperature measurement is obtained, these remotely positioned signal device 70 communicates the information to the processor 74 for evaluation. Further in example, the signal device 70 is positioned in or on the cutting head 1300 so as to be in direct contact with a portion of, and/or a component part of, the cutting head 1300. Being in direct contact allows the signal device 70 to directly measure the temperature value and communicate the information to the processor 74 for evaluation. The signal device 70 is incorporated into or is a component part of the interface board 88, such that the interface board 88 is capable of measuring the temperature of the interface board 88 or the space 89 in which the interface board 88 is positioned. The signal device 70 is positioned on a surface of a component part of the cutting head 1300, such as an exterior surface 24, 36, and/or 52 and/or an interior surface of the body 10 (surfaces 46, 34), so that the signal device 70 directly measures the temperature of the surface on which the signal device 70 is positioned. As depicted in FIGS. 13 and 14, the signal device 70 is a RFID communication system that directly measures the component part to which the tag 84 is coupled (e.g., the adapter 20, the orifice holder 40, and/or the nozzle 50). The tag 84 is adapted to have an on-board temperature sensor that stores the temperature data and communicates with the reader 82 to thereby send the data to the interface board 88 and thereafter the processor 74 for further evaluation. In some embodiments, one of the tags 84a and associated reader 82a are strategically positioned near the exterior surface 46 of the orifice holder 40 to measure the temperature of the orifice holder 40 and another of the tags 84b and associated reader 82b are strategically positioned near the interior surface 34 of the housing 30 to measure the temperature of the nozzle 50. Additionally, one of the tags 84a and associated reader 82a are strategically positioned near one or more of the junctions 29 and 39 to measure the temperature of the component parts that define the respective junctions 29 and 39, and the another of the tags 84b and associated reader 82b are strategically positioned near the junction 49 to measure the temperature of the component parts that define the respective junction 49.

Embodiments of the cutting head 1300 comprise the processor 74 being adapted to alter the performance and operation of the cutting head 1300 based on the information received, and in particular the temperature information received. The processor 74 comprises an algorithm or software adapted to analyze the temperature information and provide instructions to the pressurized liquid jet cutting system according to the information received. For example, the processor 74 is adapted to receive the temperature measurement values of one or all of the signal devices 70 in operation with the cutting head 1300. In other words, the processor 74 is capable of receiving a temperature measurement value from a signal device 70 of the remotely-positioned, indirect variety, as well as a temperature value from a signal device 70 of the RFID internally-positioned, direct variety.

The processor 74 is adapted to compare each of the measured temperature values received from the one or more signal devices 70 to a predetermined temperature value or threshold. The predetermined temperature value or threshold is a different temperature value for each portion of the cutting head 1300 or for each component part of the cutting head 1300. For example, the predetermined temperature threshold for the signal device 70 proximate the exterior surface 46 of the orifice holder 40 is different than the predetermined temperature threshold for the signal device 70 remotely located or positioned on an external surface of the cutting head 1300.

In operation, should the received or measured temperature exceed the predetermined temperature threshold, the processor 74 instructs the material processing system to shut down the cutting head 1300 to conserve the longevity or functionality of the component parts of the cutting head 1300, including the electronic component parts. Alternatively, the processor 74 analyzes one or more threshold values and issue a warning should the measured temperature exceed the first threshold value and issue a second warning should the measured temperature exceed the second threshold value, and so on and so forth until the ultimate threshold value is exceeded, at which point the processor 74 instructs the material processing system to cease operation of the cutting head 1300.

Further in example, the processor 74 is adapted to calculate a rate of change, or a temperature gradient, of the measured temperature values received over time from any of the signal devices 70. Using the rate of change as a predetermined temperature threshold, the processor 74 compares the calculated rate of change, or temperature gradient, with a predetermined rate of change value or threshold. Should the calculated rate of temperature change exceed the predetermined rate threshold, the processor 74 instructs the pressurized liquid jet cutting system to shut down the cutting head 1300 to conserve the longevity or functionality of the component parts of the cutting head 1300, including the electronic component parts. Similarly to the instructions above, the processor 74 makes one or more comparisons of the calculated temperature gradient with one or more threshold temperature gradients and provide the corresponding instruction, such as issuing a first warning, second warning, error message, or shut-down message, depending on which threshold temperature gradient has been exceeded. For example, surpassing a lower-level temperature gradient threshold triggers a simple error message or a warning, whereas surpassing a highest-level temperature gradient threshold triggers an immediate shutdown instruction or message.

In addition, the processor 74 is adapted to combine the above-mentioned examples and compare both the measured temperature value with the predetermined threshold as well as the rate of change calculated value with the rate of change predetermined threshold. Should one or both values exceed the threshold, the processor 74 instructs the material processing system to shut down the cutting head 1300 to conserve the longevity or functionality of the component parts of the cutting head 1300, including the electronic component parts.

Embodiments of the cutting head 1300 comprise the communication network 90 being manufactured into the cutting head 1300 at the time of manufacture of its component parts or comprise the communication network 90 being retrofitted onto existing cutting heads, postmanufacture. In this way, the leak detection technology and the temperature sensing technology is incorporated onto existing and/or new cutting heads 1300 to preserve the useful life and operation of the cutting heads 1300.

In addition to the structural disclosure of the cutting head 1300, methods of detecting an error in the cutting head 1300 are also described herein. Methods of detecting an error in a pressurized fluid jet cutting head comprise providing a cutting head having a first component part having a first interface (i.e., interface surface, engagement surface or sealing surface) and a second component part having a second interface (i.e., interface surface, engagement surface or sealing surface) with the first interface abutting the second interface. A temperature sensor is provided in the cutting head for measuring a temperature associated with the first and second interfaces (i.e., the junction established between the first and second interfaces). In some embodiments, the method further includes measuring a temperature of the fluid jet cutting head and indicating an error associated with the cutting head and/or one or more of the first and second component parts upon detecting a temperature change in the cutting head. In other embodiments, the method further includes the error including a location position of a leak path of the pressurized liquid in the cutting head identifiable depending upon which of the signal devices in the cutting head measured the temperature change.

The methods further comprise the first component part being the orifice holder and the second component part being one of the adapter and the nozzle. Also, the first component part is the valve and the second component part is the valve seat. The method further includes the error message indicating a misalignment of component parts or between the first and second component parts.

The methods further comprise the indicating an error step including the steps of receiving the measured temperature by a controller, comparing the measured temperature to one of a plurality of reference temperature profiles, correlating the measured temperature to one of reference temperature profile, and identifying the error based upon the correlated profile. The methods further comprise the step of measuring including the step of creating a temperature profile over time.

The methods further comprise detecting an error in a pressurized fluid jet cutting head by providing a cutting head having a first head component having a first interface and a second head component having a second interface, the first interface abutting the second interface, providing a temperature sensor in the cutting head for measuring a temperature associated with first and second interfaces, providing a controller in communication with the temperature sensor, measuring a temperature of the fluid jet cutting head over a period of time, creating a temperature over time profile by the controller, matching the temperature over time profile with one of a plurality of reference temperature profiles stored in the controller, and indicating an error associated with the one of the first and second head components based upon matching the temperature over time profile to one of the reference profiles.

The methods further comprise operating a pressurized fluid jet cutting head by providing a cutting head having a plurality of component parts, providing a temperature sensor in the cutting head for measuring a temperature associated with at least one of the component parts, providing a controller in communication with the temperature sensor, measuring a temperature over a period of time, creating by a computer a temperature gradient profile, matching the temperature gradient profile with one of a plurality of reference temperature profiles stored in the controller, and controlling an operation of the cutting head based upon matching the temperature gradient profile to one of the reference profiles, including shutting down the cutting head.

While the invention has been particularly shown and described with reference to specific preferred embodiments, it should be understood by those skilled in the art that various changes in from and detail may be made therein

TABLE 1

Summary of exemplary key components and their respective RFID tag and reader locations as shown in FIGS. 4-11.

| FIG. | Component with RFID | Reader Location |
|---|---|---|
| FIG. 4 | Cylinder | High pressure end cap or hydraulic end cap |
| FIG. 4 | Hydraulic Seal Housing | Hydraulic end cap |
| FIG. 4 | Hydraulic Seal Housing | Hydraulic end cap |
| FIG. 4 | Plunger bearing | Hydraulic end cap |
| FIG. 5 | Check Valve | High pressure end cap |
| FIG. 5 | Output adaptor | High pressure end cap |
| FIG. 6 | Proximity Switch | Hydraulic end cap |
| FIG. 6 | Indicator Pin | Hydraulic end cap |
| FIG. 7 | Bleed down valve | Top deck |
| FIG. 8 | 90,000 PSI Seal Cartridge | Hydraulic end cap |
| FIG. 9 | Attenuator | Top deck |
| FIG. 10 | Cutting Head Adapter | Cutting Head with RFID |
| FIG. 11 | On/Off Valve Body | Valve Actuator |

What is claimed is:

1. A pressurized liquid jet cutting system comprising:
a pump for generating a pressurized liquid for delivery to a cutting head of the liquid jet cutting system;
a plurality of replaceable components for producing the pressurized liquid;
at least one data storage device associated with at least one of the plurality of replaceable components, the at least one data storage device configured to store usage data corresponding to the at least one replaceable component; and
a computing device in communication with the at least one data storage device for tracking the usage data of the at least one replaceable component, wherein the computing device is configured to (i) automatically reset a predicted life of the at least one replaceable component after the at least one replaceable component is replaced with a new component and (ii) transmit the usage data to a cloud-based remote storage device.

2. The pressurized liquid jet cutting system of claim 1, wherein the at least one replaceable component is a cylinder, a hydraulic seal housing, a plunger bearing, a hydraulic end cap, a check valve body, a high pressure end cap, an output adapter, a proximity switch, an indicator pin, an orifice holder, or a nozzle.

3. The pressurized liquid jet cutting system of claim 1, wherein the at least one data storage device is in physical contact with a body portion of the at least one replaceable component.

4. The pressurized liquid jet cutting system of claim 1, wherein the data storage device includes a sensor that provides data about an environmental condition within or near the at least one replaceable component.

5. The pressurized liquid jet cutting system of claim 4, wherein the data provided by the sensor is stored on the data storage device.

6. The pressurized liquid jet cutting system of claim 4, wherein the data provided by the sensor is communicated to the computing device.

7. The pressurized liquid jet cutting system of claim 1, further comprising a reader in communication with the at least one data storage device and the computing device, the reader is configured to forward the usage data stored on the at least one data storage device to the computing device.

8. The pressurized liquid jet cutting system of claim 7, wherein metal located between the reader and the at least one data storage device in the liquid jet cutting system is minimized or eliminated.

9. The pressurized liquid jet cutting system of claim 7, wherein the computing device is configured to write new data to the at least one data storage device via the reader.

10. The pressurized liquid jet cutting system of claim 1, wherein the data storage device is writable.

11. The pressurized liquid jet cutting system of claim 10, wherein the data storage device is writable during an operation of the liquid jet cutting system.

12. The pressurized liquid jet cutting system of claim 1, wherein the at least one data storage device is a radio-frequency identification (RFID) tag.

13. The pressurized liquid jet cutting system of claim 1, wherein the at least one data storage device is located in a low pressure region of the liquid jet cutting system.

14. The pressurized liquid jet cutting system of claim 1, wherein the computing device is further configured to determine a remaining usable life of the at least one replaceable component based on the usage data stored on the at least one data storage device.

15. The pressurized liquid jet cutting system of claim 1, wherein the usage data comprises one or more of a number of hours of operation, a number of operational cycles, a number of pressure cycles, a time of operation, a number of pump starts, a measure of detected strain, or a measure of fluid exposure for the at least one replaceable component.

16. The pressurized liquid jet cutting system of claim 1, wherein the usage data conveys an identity of the at least one replaceable component.

17. The pressurized liquid jet cutting system of claim 1, further comprising a cloud-based, remote data storage device in communication with the computing device, the remote data storage device configured to store bulk data collected by the at least one data storage device over time.

18. The pressurized liquid jet cutting system of claim 1, further comprising a second data storage device associated with a second of the plurality of replaceable components, the second data storage device configured to track usage data of the second replaceable component, the computing device configured to communicate with the second data storage device to track the usage data of the second replaceable component.

19. The pressurized liquid jet cutting system of claim 18, wherein the computing device is configured to automatically reset a predicted life of the second replaceable component after the second replaceable component is replaced with a new component.

20. The pressurized liquid jet cutting system of claim 19, wherein the predicted life of the second replaceable component is different from the predicted life of the at least one replaceable component.

21. A method of operating a pressurized liquid jet cutting system comprising a pump having at least one replaceable component and a cutting head, the method comprising:
generating, by the pump, a pressurized liquid for delivery to the cutting head;
tracking, by a data storage device associated with the at least one replaceable component of the pump, usage data corresponding to the at least one replaceable component;
communicating, by a reader, the usage data to a computing device;
automatically resetting, by the computing device, a predicted usable life of the at least one replaceable component after detecting that the at least one replaceable component is replaced with a new component; and transmitting, by the computing device, the usage data to a cloud-based remote storage device.

22. The method of claim 21, further comprising writing, by the computing device, data to the data storage device via the reader.

23. The method of claim 21, further comprising generating, by the computing device, an alert when usage time of the at least one replaceable component approaches the predicted usable life.

24. The method of claim 21, further comprising:
sensing, by a sensor of the data storage device, an environmental condition associated with the at least one replaceable component; and
storing, by the data storage device, the sensed data.

25. The method of claim 21, further comprising:
tracking, by a second data storage device associated with a second replaceable component of the pump, usage data corresponding to the second replaceable component; and
automatically resetting, by the computing device, a predicted usable life of the second replaceable component after detecting that the second replaceable component is replaced with a new component.

26. The method of claim 25, wherein the predicted usable life of the second replaceable component is different from the predicted usable life of the at least one replaceable component.

\* \* \* \* \*